(12) United States Patent
Jovanovic et al.

(10) Patent No.: US 10,618,826 B2
(45) Date of Patent: Apr. 14, 2020

(54) MICROSCALE-BASED DEVICE FOR PURIFYING FLUID AND METHOD OF USE

(71) Applicant: Oregon State University, Corvallis, OR (US)

(72) Inventors: Goran N. Jovanovic, Corvallis, OR (US); Chris Loeb, Corvallis, OR (US); Thomas Lindner, Corvallis, OR (US); Kevin Drost, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 289 days.

(21) Appl. No.: 15/179,825

(22) Filed: Jun. 10, 2016

(65) Prior Publication Data

US 2016/0289098 A1    Oct. 6, 2016

Related U.S. Application Data

(63) Continuation-in-part of application No. PCT/US2014/069762, filed on Dec. 11, 2014.
(Continued)

(51) Int. Cl.
*C02F 1/469* (2006.01)
*C02F 1/461* (2006.01)
(Continued)

(52) U.S. Cl.
CPC ........ *C02F 1/4691* (2013.01); *C02F 1/46109* (2013.01); *C02F 2001/46161* (2013.01);
(Continued)

(58) Field of Classification Search
CPC .................................................. C02F 1/4691
See application file for complete search history.

(56) References Cited

U.S. PATENT DOCUMENTS

| 2002/0167782 A1* | 11/2002 | Andelman | .............. | C02F 1/008 |
| | | | | 361/302 |
| 2008/0023333 A1* | 1/2008 | Johnson | ................ | C02F 1/4691 |
| | | | | 204/554 |

(Continued)

FOREIGN PATENT DOCUMENTS

| KR | 10-2008-0113911 | 12/2008 |
| WO | WO 2013/103236 | 7/2013 |

OTHER PUBLICATIONS

International Search Report issued for International Application No. PCT/US2014/069762 dated Mar. 31, 2015, 3 pages.
(Continued)

*Primary Examiner* — Salil Jain
(74) *Attorney, Agent, or Firm* — Klarquist Sparkman, LLP

(57) ABSTRACT

Disclosed herein are embodiments of a microscale-based device suitable for purifying fluid, and method of using the device. In particular disclosed embodiments, an electrode layer comprising an enhanced surface area electrode material that has multiple extensions covered in a conductive material are used within the device. The device comprises one or more main flow pathways and one or more side channels. The flow dynamics of the device may be controlled in order to remove contaminants from the fluid. The extensions of the enhanced surface area electrode material are positioned on the surface of the pathways and also may be positioned within the side channels.

18 Claims, 36 Drawing Sheets

Related U.S. Application Data

(60) Provisional application No. 61/915,312, filed on Dec. 12, 2013.

(51) Int. Cl.
    *C02F 101/14*     (2006.01)
    *C02F 101/16*     (2006.01)
    *C02F 101/20*     (2006.01)
    *C02F 103/08*     (2006.01)
    *C02F 101/10*     (2006.01)
    *C02F 101/18*     (2006.01)

(52) U.S. Cl.
    CPC .... *C02F 2101/10* (2013.01); *C02F 2101/108* (2013.01); *C02F 2101/14* (2013.01); *C02F 2101/163* (2013.01); *C02F 2101/18* (2013.01); *C02F 2101/20* (2013.01); *C02F 2101/203* (2013.01); *C02F 2103/08* (2013.01); *C02F 2209/05* (2013.01); *C02F 2301/04* (2013.01); *C02F 2305/08* (2013.01)

(56) References Cited

U.S. PATENT DOCUMENTS

| | | | |
|---|---|---|---|
| 2012/0186980 A1* | 7/2012 | Ramaprabhu | B03C 5/02 204/554 |
| 2013/0048510 A1 | 2/2013 | Servida | |
| 2013/0134043 A1 | 5/2013 | Verschuren | |

OTHER PUBLICATIONS

Written Opinion issued for International Application No. PCT/US2014/069762 dated Mar. 31, 2015, 9 pages.

\* cited by examiner

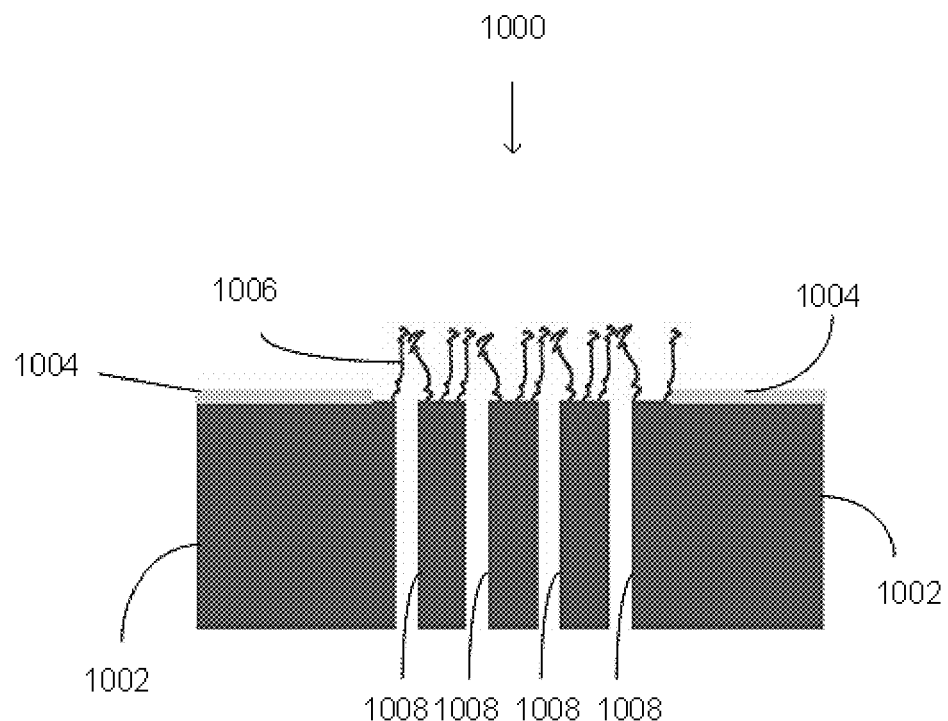
FIG. 10
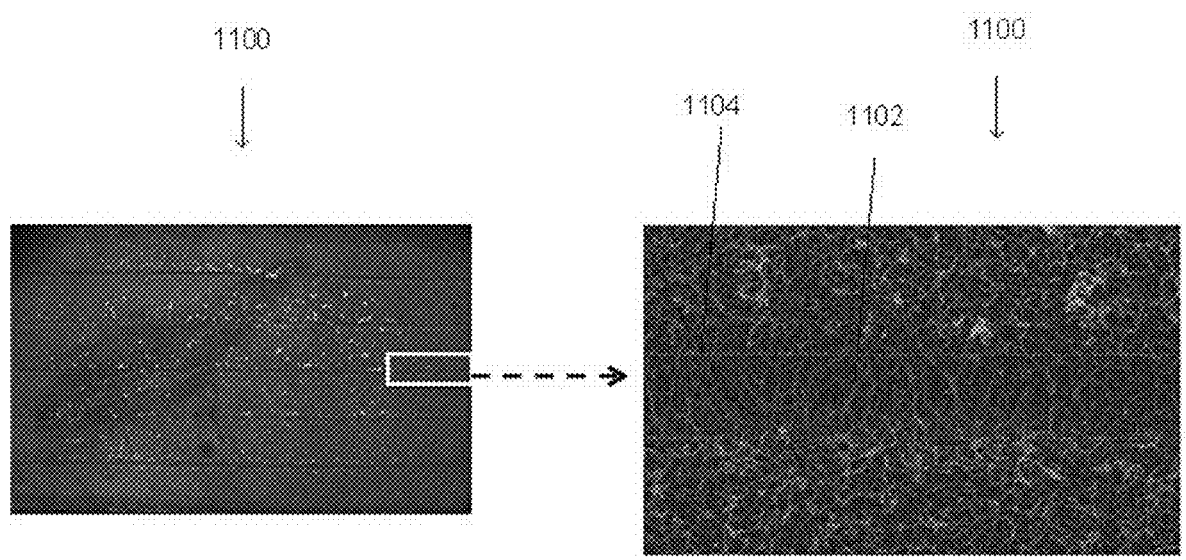
FIG. 11A
FIG. 11B

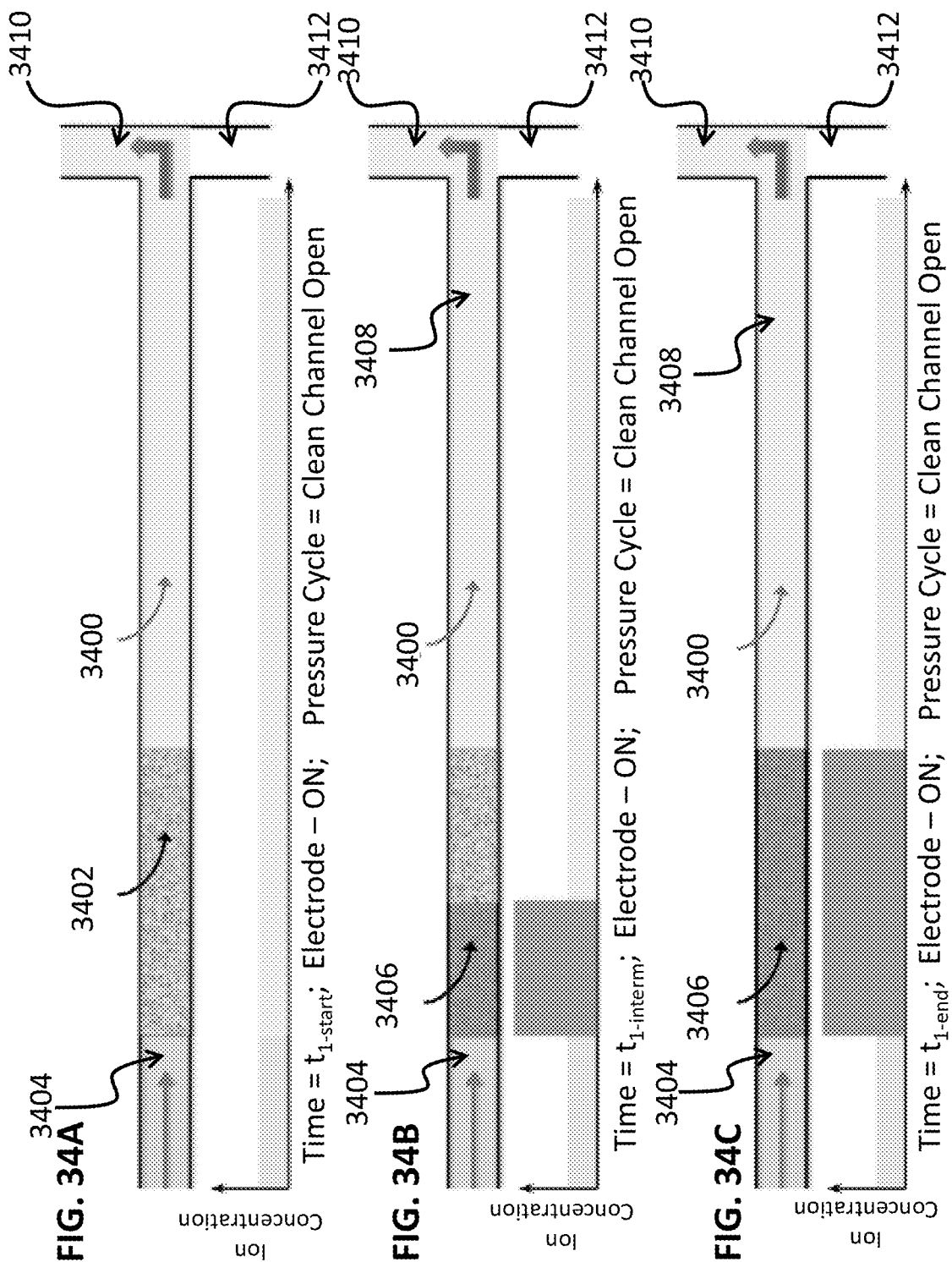

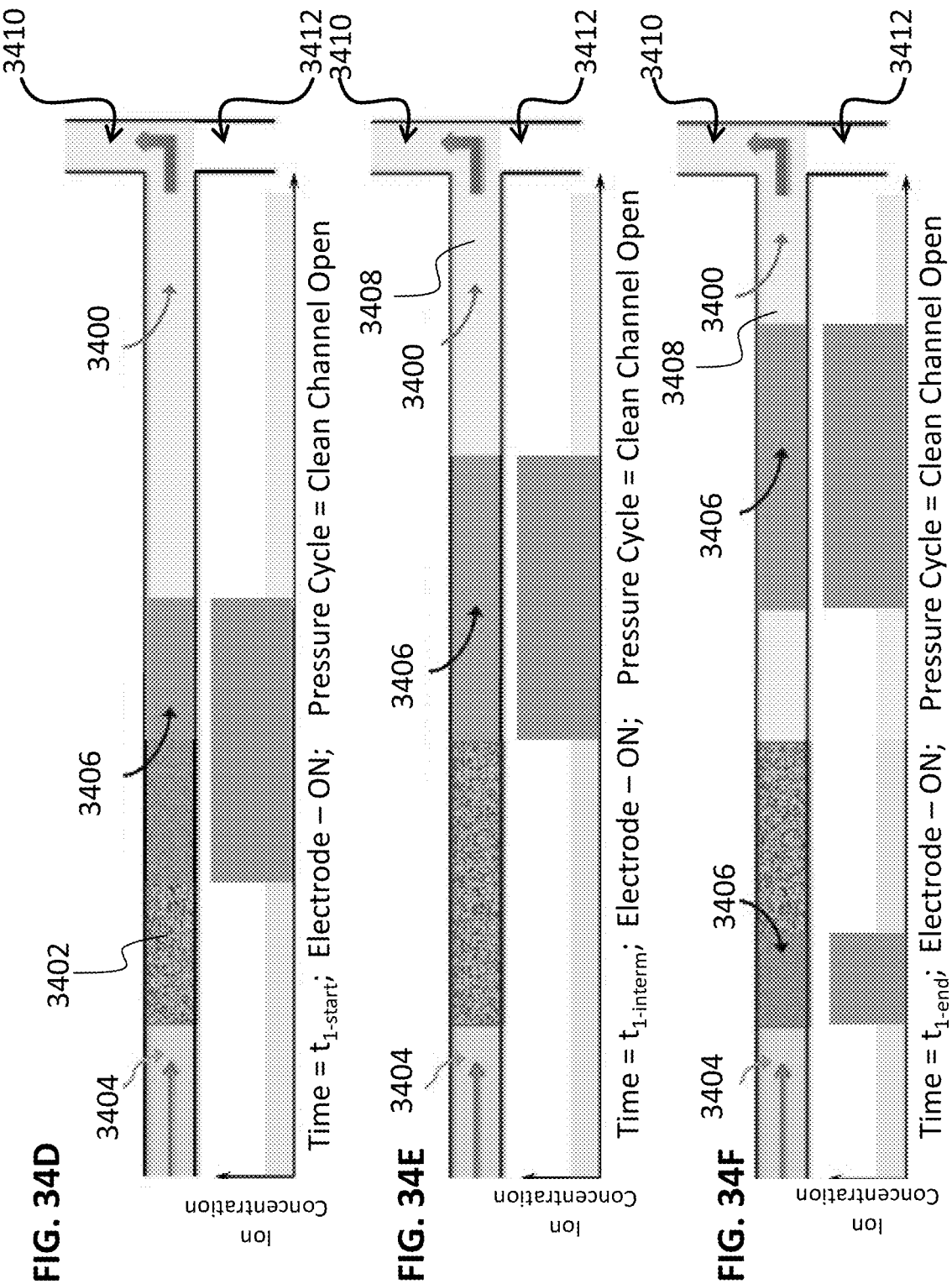

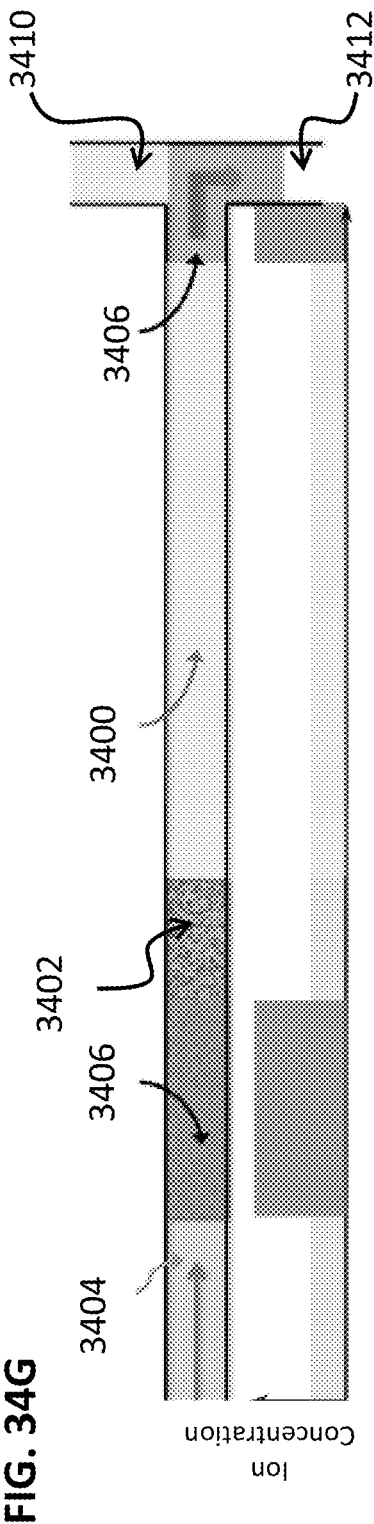
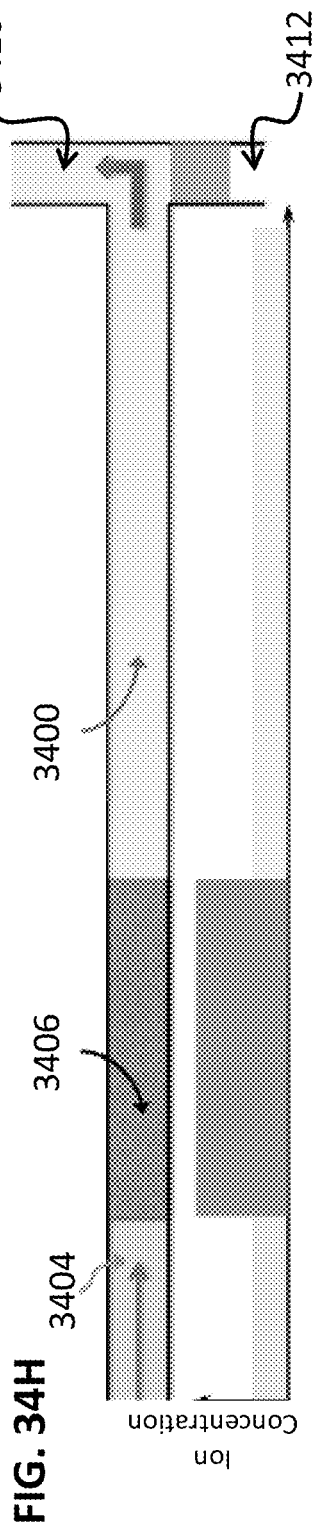
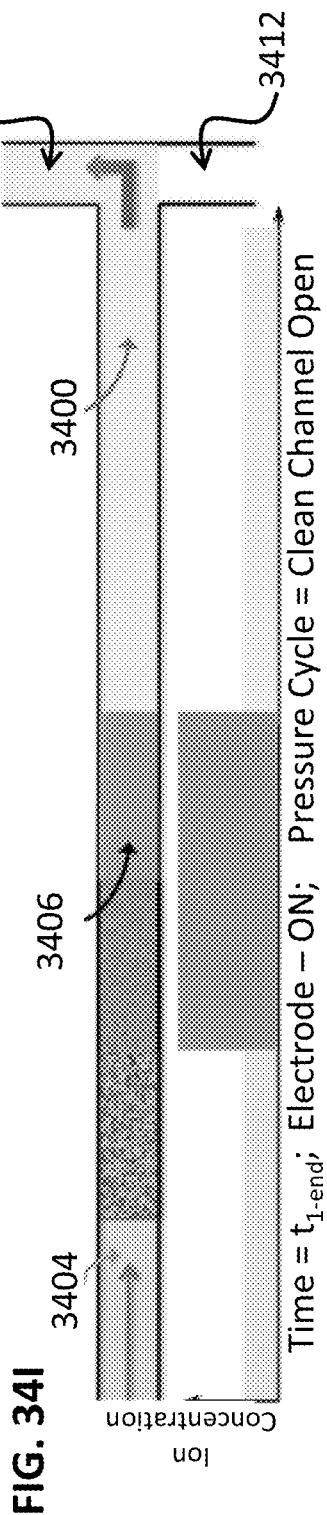

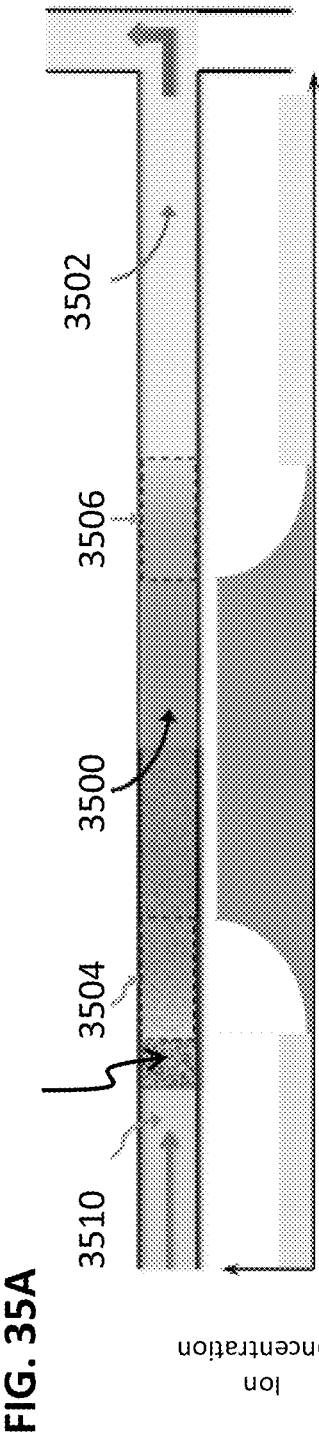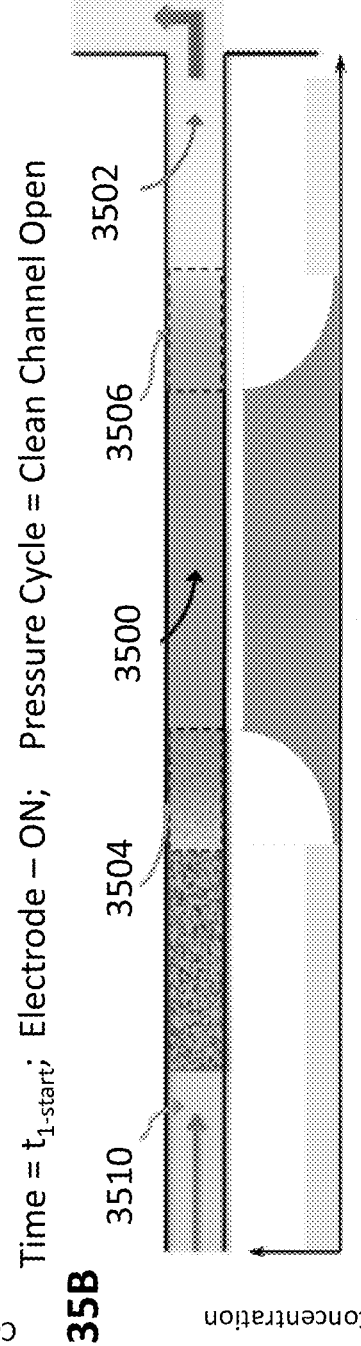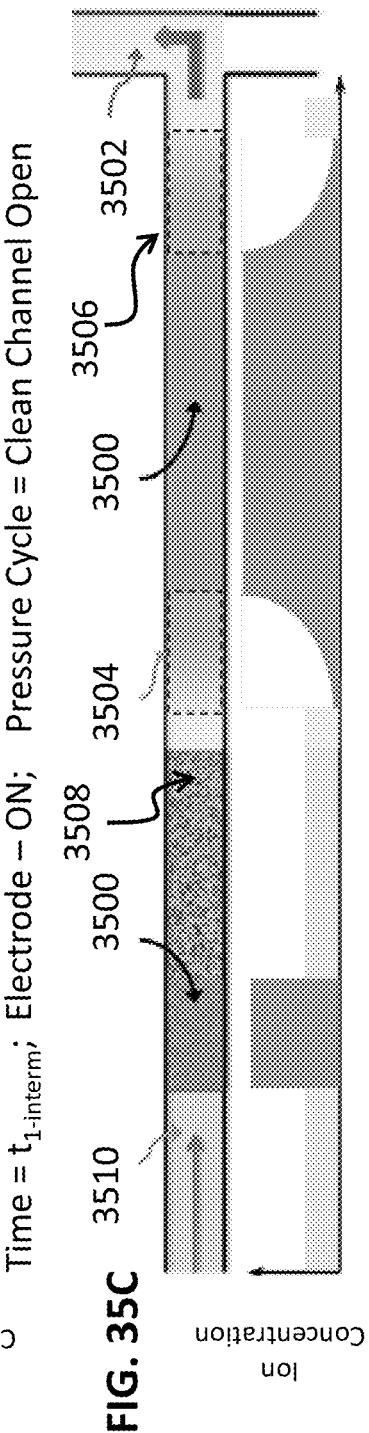
FIG. 35A  Time = $t_{1-start}$; Electrode – ON; Pressure Cycle = Clean Channel Open
FIG. 35B  Time = $t_{1-interm}$; Electrode – ON; Pressure Cycle = Clean Channel Open
FIG. 35C  Time = $t_{1-end}$; Electrode – ON; Pressure Cycle = Clean Channel Open

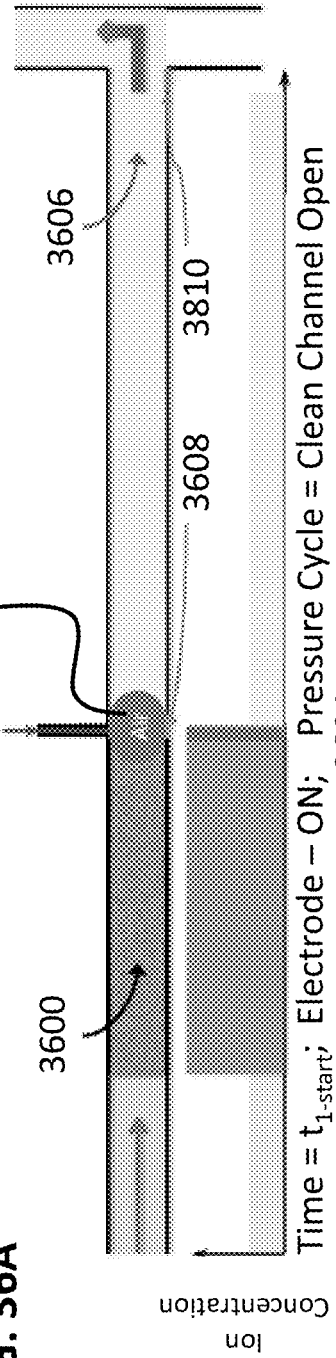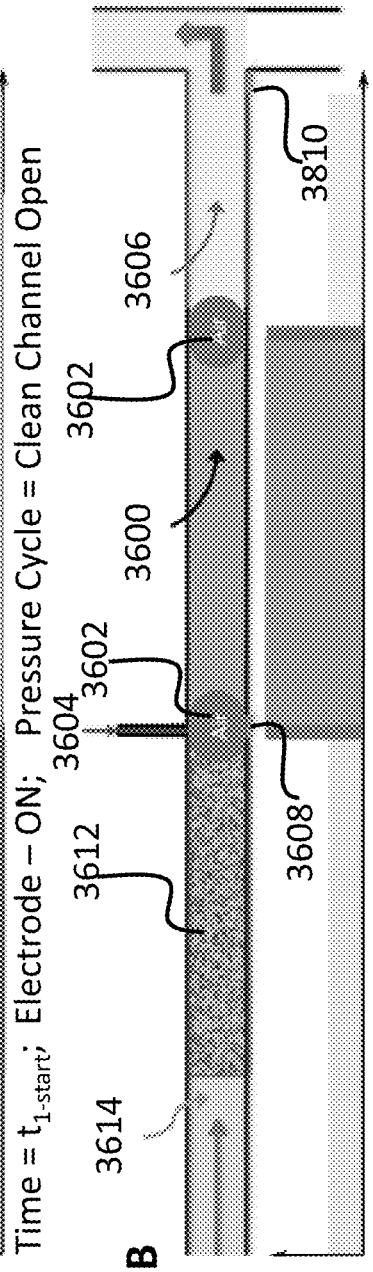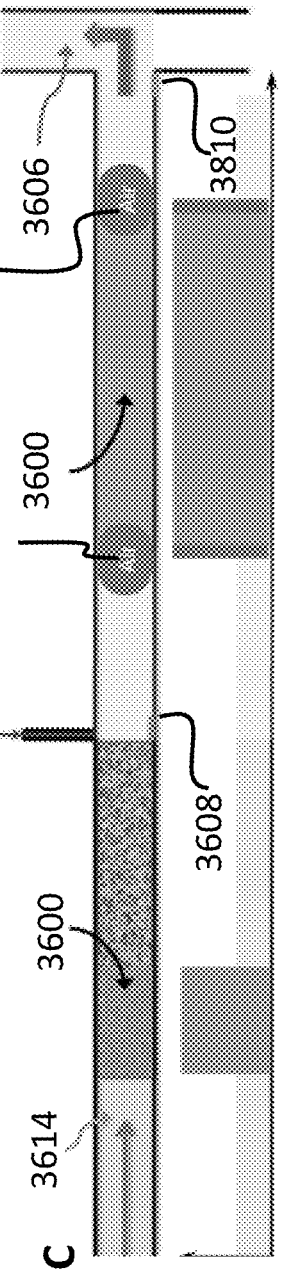

MICROSCALE-BASED DEVICE FOR PURIFYING FLUID AND METHOD OF USE

CROSS REFERENCE TO RELATED APPLICATION

This application is a continuation-in-part of International Application No. PCT/US2014/069762, filed on Dec. 11, 2014, which claims the benefit of the earlier filing date of U.S. Provisional Patent Application No. 61/915,312, filed Dec. 12, 2013, each of which is incorporated herein by reference in its entirety.

FIELD

The present disclosure concerns a microscale-based device that utilizes capacitive deionization technology (CDT), and a method for using the device to purify fluids.

BACKGROUND

Three primary technologies are currently used for seawater desalination: Multi Stage Flash Distillation (MSF); Multi Effect Desalination (MED); and Reverse Osmosis desalination (RO). A newer technology, Capacitive Deionization Technology (CDT), was developed in the 1990s, but has not been implemented commercially. MSF and MED technologies use thermal processes and depend on the availability of low cost waste heat for economic operation. If waste heat is not available, the energy consumption of these approaches is very high; typically too high for practical commercial applications. RO, in contrast, operates at ambient temperatures, but requires high pressure to push the water through the membranes. RO is therefore energy consumptive. In addition, the membranes used in RO processes need to be cleaned on a regular basis and they have a limited lifetime; therefore, the membranes must be replaced at high cost after limited operation.

Historical attempts to reduce capacitive deionization phenomenon to a practical CDT technology have not been successful, due to a lack of appropriate construction materials and suitable designs for functional devices. Recently, a novel electrode material, carbon aero-gel, which has favorable performance characteristics, has been discovered. It is currently believed that combining this aero-gel material with the macroscopic designs of a deionization cell that would be applicable in a commercial setting likely would cause inefficiently slow diffusion of salt away from the electrodes of the apparatus during discharge cycles. Such slow diffusion provides only a small fraction of deionized fluid from the impure fluid supply. A need therefore still exists for devices that are capable of providing purified fluids, particularly water, while minimizing the energy requirements needed for operation.

SUMMARY

The present disclosure concerns a device, particularly a microscale-based device, for purifying fluids, and more particularly liquids, such as water. The device comprises multiple components that function to remove contaminants from fluids introduced into the device. In particular disclosed embodiments, the device comprises one or more lamina, with at least one lamina comprising a main flow pathway. The device also comprises an entry port, an exit port, and at least one electrode, which is powered by a power source. In some embodiments, the electrode is applied to the device as a layer. In some embodiments, the electrode is coupled to a portion of the main flow pathway and comprises one or more extensions covered with an electrically conductive material that increase the surface area of the electrode layer (referred to herein as an enhanced surface area electrode material). The enhanced surface area electrode material is used to increase the number of ionic species that may be separated from fluids flowing through the main channel. In particular disclosed embodiments, the device comprises two opposing electrode layers having opposite charges.

The electrode layer of the disclosed device may be made of an electrically conductive substrate comprising a conductive metal or alloy, such as stainless steel, graphene, graphite, carbon fibers, a conductive polymer, or combinations thereof. In particular disclosed embodiments, the electrode layer may be a solid layer. In other embodiments, the electrode layer may be a mesh material. In some embodiments, the enhanced surface area electrode material may be a porous electrode to which ionic species may be attracted, and it may be added to, or generated from, the electrode layer. The extensions making up the enhanced surface area electrode material may have any effective geometric shape, with some embodiments being straight, coiled, or combinations thereof. In particular disclosed embodiments, the enhanced surface area electrode material may comprise nanostructures, such as nanowires, nanosprings, or nanograss. In particular disclosed embodiments, the electrode layer comprising the enhanced surface area electrode material is positioned on the surface of the main flow pathway and/or the side channel. In some embodiments, the extensions that make up the enhanced surface area electrode material may extend over the entrance to the side channels and/or they may be positioned within the flow path of either the main flow pathway or the side channels. In particular disclosed embodiments, the extensions are covered with an electrically conductive material, such as graphene and other conductive forms of graphite. In some embodiments, the graphene has a substantially micro-crystalline grain size ranging from about 2 nm to about 15 nm, basal planes that are substantially planar, and exhibits an anodic potential of at least 2 volts to about 3 volts. Other conductive materials resistant to certain ion-containing fluids (e.g., seawater) can be used, such as conductive polymer coatings. The extensions typically comprise a structural material that may be grown from, or applied conformally to, the electrode layer. The structural material is selected to be resistant to degradation at temperatures above about 300° C. In particular disclosed embodiments, the structural material is silica.

In some embodiments, the device further comprises a separation zone comprising at least one side channel through which fluid contaminants are expelled. The side channels may be positioned at an angle, such as perpendicular, to the main flow pathway. A fluid is introduced into the device via an entry port and flows through the main flow pathway. When the power source is activated and charges the electrode layer, ions from the fluid are attracted to the electrode layer, as well as the enhanced surface area electrode material. In some embodiments, ions collected at the electrode layer and/or enhanced surface area electrode material are then guided through the side channels of the device via a combination of flow momentum and overall chemical potential difference.

The device may comprise one or more lamina, which may be made from any suitable material, such as a material selected from a polymeric material, glass, carbon-based material, or combinations thereof. Exemplary polymeric materials include, but are not limited to, polycarbonate, polyethylene terephthalate (PET), polyether imide (PEI), poly(methyl methacrylate) (PMMA), poly(tetrafluoroethylene) (PTFE), hexafluoropropylene, vinylidene fluoride, perfluoromethylvinylether, or a copolymer thereof.

In certain embodiments, the device may comprise a plurality of laminae, which are coupled together to form a single device cell. A plurality of individual device cells can be linked so as to be fluidically and/or electrically connected with other device cell(s). The device cells may be fluidly coupled in series, parallel, or combinations thereof.

In particular disclosed embodiments, the device may further comprise an accumulation tank that serves as a source of, and/or reservoir for, purified fluid. The accumulation tank may be integrated with, or separate from, the microscale-based cell. In particular disclosed embodiments, the device comprises multiple device cells with at least one separation tank positioned between each device cell.

In particular embodiments, the device may further comprise one or more support pillars that can be used in embodiments wherein multiple lamina are stacked in order to provide improved structural support. To control flow dynamics, the device also may further comprise one or more valves that may be connected to, or integrated with, the device. These valves may be operated to manipulate flow through the main flow pathway and/or the side channels. The device also may comprise a clamping fixture top and a clamping fixture bottom that form the outer-most surface of the device. In yet other embodiments, the device may comprise at least one sensor positioned within the side channel. Suitable sensors may be used to, for example, detect the level of ions flowing through the side channel, or to control the time during which the electrode is "on" and "off," etc. The operation of the device also may be controlled by a computer.

In some embodiments, the device can further comprise two conductivity micro-sensors wherein one conductivity micro-sensor is positioned proximal to the enhanced surface area electrode material and another conductivity micro-sensor is positioned downstream of the first conductivity micro-sensor and proximal to the exit port through which the substantially purified fluid exits the device. The device can further comprise a droplet side channel fluidly coupled to the main flow pathway and that is positioned proximal to the enhanced surface area electrode material to introduce one or more droplets into the main flow pathway.

The device may be used to purify any fluid suitably purified using CDT. For example, the fluid may be selected from a polar fluid, a non-polar fluid, a biological fluid, or combinations thereof. In particular disclosed embodiments, the fluid is water, blood, urine, or other suitable polar or nonpolar fluids.

Also disclosed herein is a method for purifying fluid using embodiments of the disclosed device. For example, one embodiment comprises introducing a stream of impure fluid, such as water, comprising one or more contaminants into disclosed embodiments of the device. The device is operated to purify fluid, and purified fluid may be collected from the device. The contaminants typically include inorganic salts, inorganic ions, metals, metal alloys, and combinations thereof. In particular disclosed embodiments, the contaminants are $Ca^{2+}$, $Na^+$, $Mg^{2+}$, $CN^-$, $NO_3^-$, $F^-$, $Cl^-$, $Fe^{3+}$, $Cu^{2+}$, $Pb^{2+}$, $SO_4^{2-}$, $HCO_3^-$, $Br^-$, $BO_3^{3-}$, $SiO_3^{2-}$, $I^-$, or combinations thereof. The disclosed method may be performed continuously or batch-wise. In some embodiments, the method includes introducing one or more droplets into the main flow pathway through a droplet side channel positioned proximal to the enhanced surface area electrode. The device used in such method embodiments can comprise one or more valves for controlling flow of the purified fluid and the contaminants and the method further comprises opening and closing the one or more valves to facilitate flow of the purified fluid or the contaminants from the main flow pathway to one or more side channels. In some embodiments of the method, a first droplet is introduced into the device prior to release of contaminants from the electrode layer and wherein a second droplet is introduced into the device after release of contaminants from the electrode layer. The first droplet and the second droplet can be introduced so as to prevent back-diffusion and/or onward-diffusion between the contaminants and the purified fluid.

The foregoing and other objects, features, and advantages of the present disclosure will become more apparent from the following detailed description, which proceeds with reference to the accompanying figures.

BRIEF DESCRIPTION OF THE DRAWINGS

FIG. 5A is a schematic perspective view of an additional embodiment of the disclosed device wherein a parallel/sequential arrangement of device cells is used. FIG. 5B is a magnified, cross-sectional view of a portion of the device illustrated in FIG. 5A.

FIG. 10 is schematic cross-sectional view of one embodiment of the disclosed side channels of the device comprising nanosprings that are grown from the electrode layer material.

FIGS. 11A and 11B are SEM images illustrating a partial view of nanosprings grown on the topside of shunt slits on a disclosed embodiment of the device. FIG. 11B provides a magnified view of the nanosprings that extend across the slits.

FIG. 28A is a top plan view of an embodiment of the device, FIG. 28B is a cross-sectional view of section A as illustrated in FIG. 28A, and FIG. 28C is a similar top plan view of an embodiment of the device comprising multiple support pillars.

FIG. 31A illustrates a schematic exploded perspective view of a device embodiment; FIG. 31B provides a magnified view of a portion of the device of FIG. 31A; and FIG. 31C is a magnified view of the portion of the device illustrated in FIG. 31B.

FIGS. 34A-34I are schematic cross-sectional diagrams illustrating theoretical flow through a device embodiment where no back-diffusion and/or onward-diffusion occurs; FIGS. 34A-34C illustrate flow through a main flow pathway and separation of a purified fluid segment and accumulation of contaminant ions thereby forming a concentrated contaminant segment; FIGS. 34D and 34E illustrate release of the concentrated contaminant segment from the electrode as it is switched off; FIGS. 34F-34H illustrate flow of the released concentrated contaminant segment through the main flow pathway and accumulation of another separated concentrated contaminant segment as the electrode is again switched on; and FIG. 34I illustrates release of the subsequent concentrated contaminant segment from the electrode as it is again switched off; each of FIGS. 34A-34I is accompanied by a graph of ion concentration as a function of time, which illustrates the ion concentration of each contaminant segment as it accumulates and is released.

FIGS. 35A-35C are schematic diagrams illustrating flow through a device embodiment wherein back-diffusion and onward-diffusion occur and causes mixing between concentrated contaminants and fluid segment thereby reducing the operability/efficiency of the device; FIGS. 35A and 35B illustrate back-diffusion and onward-diffusion as the electrode is switched off and the concentrated contaminant segment is released from the electrode and FIG. 35C illustrates accumulation of the contaminants on the electrode as it is switched back on; each of FIGS. 35A-35C is accompanied by a graph of ion concentration as a function of time, which illustrates the ion concentration of each contaminant segment as it accumulates and is released.

FIGS. 36A-36C are schematic diagrams of flow through a device embodiment wherein back-diffusion and onward-diffusion are prevented using a droplet injection scheme; FIG. 36A illustrates the accumulated concentrated contaminant segment when the electrode is switched on and a droplet is introduced proximal to the concentrated contaminant segment; FIG. 36B illustrates the flow and separation of the concentrated contaminant segment through the main flow pathway whereby two droplets are located at each end of the segment to prevent back-diffusion and onward-diffusion when the electrode is switched off; FIG. 36C illustrates another operation phase as the electrode is switched back on and another concentrated contaminant segment is built up on the electrode; each of FIGS. 36A-36C is accompanied by a graph of ion concentration as a function of time, which illustrates the ion concentration of each contaminant segment as it accumulates and is released.

DETAILED DESCRIPTION

I. Explanation of Terms

Figure 1:
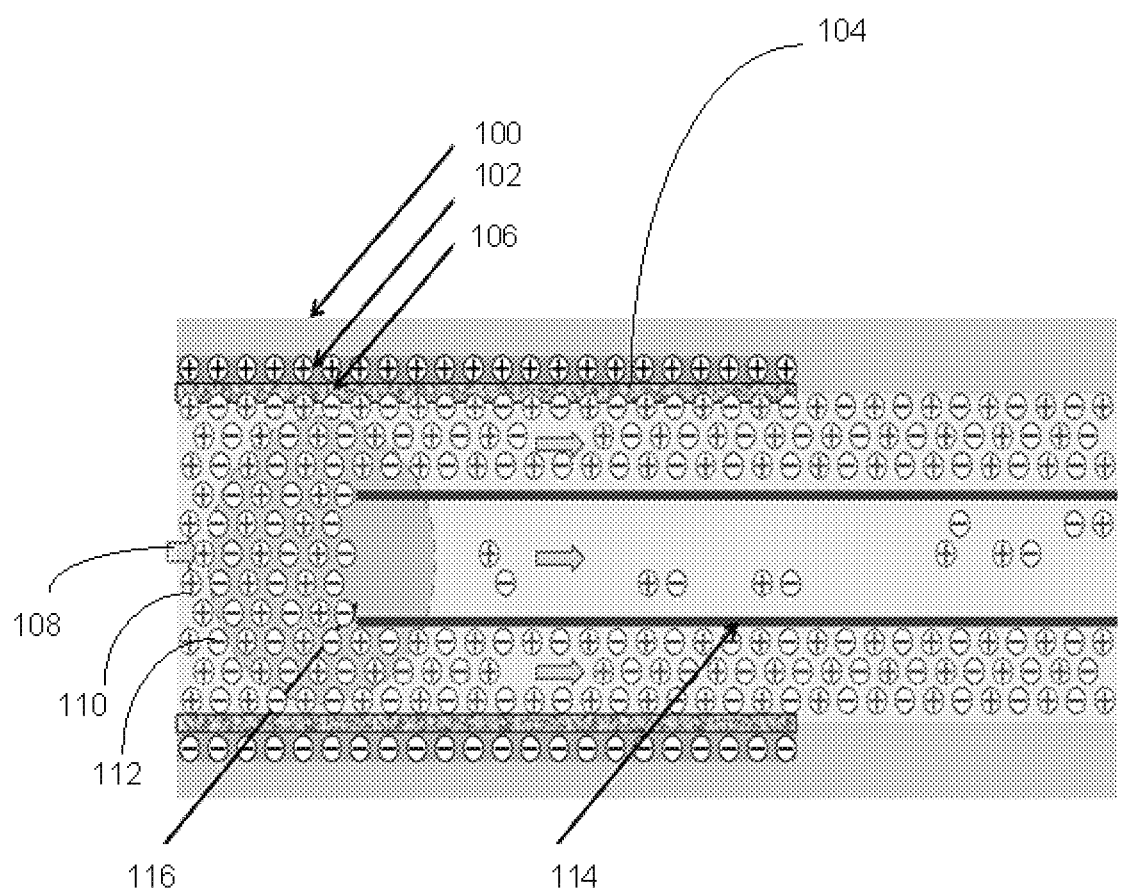
FIG. 1 is a schematic cross-sectional view of one embodiment of a disclosed device.

The following description is exemplary in nature and is not intended to limit the scope, applicability, or configuration of the present disclosure. Various changes to the described embodiment may be made in the function and arrangement of the elements described herein without departing from the scope of the preset disclosure. Further, descriptions and disclosures provided in association with one particular embodiment are not limited to that embodiment, and may be applied to any embodiment disclosed.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

Furthermore, particular disclosed embodiments that concern a device and/or method that purifies water may be used to purify other fluids.

Although the operations of exemplary embodiments of the disclosed method may be described in a particular, sequential order for convenient presentation, it should be understood that disclosed embodiments can encompass an order of operations other than the particular, sequential order disclosed, unless the context dictates otherwise. For example, operations described sequentially may in some cases be rearranged or performed concurrently. Further, descriptions and disclosures provided in association with one particular embodiment are not limited to that embodiment, and may be applied to any disclosed embodiment.

II. Introduction

The current market for water purification equipment is growing rapidly and thus a need exists for a method for purifying water that can be conducted inexpensively and also that uses the least amount of energy possible. Disclosed herein are embodiments of a device, and embodiments of a method for using the device, that apply principles of capacitive deionization technology (CDT) suitable for purifying fluids, such as water. In particular embodiments, the device is suitable both for large central water purification plants as well as small facilities that utilize renewable energy sources.

Embodiments of the disclosed device provide highly efficient water recovery while also being scalable in size and therefore applicable in a variety of applications (e.g., commercial scale, industrial scale, small scale, etc.). The disclosed embodiments are, however, not limited to use in water purification and may be used to purify other fluids, such as other polar or non-polar fluids, biological fluids (e.g., blood, urine, and the like), and combinations thereof. The disclosed device can be fabricated inexpensively.

III. Device Design

Pathway-containing lamina of the disclosed device typically comprise one or more lamina components made from inexpensive lamina materials, such as polymeric materials (e.g., polycarbonate, polyethylene terephthalate (PET), polyether imide (PEI), poly(methyl methacrylate) (PMMA), or a halogenated polyethylene such as poly(tetrafluoroethylene) (PTFE), hexafluoropropylene, vinylidene fluoride, perfluoromethylvinylether, or a copolymer thereof), glass, carbon-based material, or combinations thereof. Each lamina may be embossed using methods known in the art to produce the required pathway flow features. In particular disclosed embodiments, one lamina may be used as a single substrate layer, or multiple laminae may be stacked and bonded together using adhesives known in the art, such as epoxies, which provide sufficient elasticity to absorb stresses. Glass-filled adhesives for higher shear and tensile strength also can be used. The chosen adhesive should be electrically non-conductive and also should not leach ionic chemical compounds. Alternatively, a compression seal may be fabricated. In some embodiments, the compression seal comprises a body that holds the lamina. This body can be combined with a cap, a follower, and a sealant. The cap secures the sealant and follower to the body. The follower compresses the sealant, and the sealant surrounds the elements and creates an airtight seal.

Each lamina containing the microscale-based structure (e.g., a main flow pathway and/or side channels) can have a thickness ranging from about 20 $\mu m$ to about 550 $\mu m$, with particular embodiments ranging from about 25 $\mu m$ to about 500 $\mu m$, or from about 50 $\mu m$ to about 450 $\mu m$, or from about 100 $\mu m$ to about 400 $\mu m$; more typically the lamina has a thickness ranging from about 25 $\mu m$ to about 250 $\mu m$. The microscale-based structure formed in, or defined by, the lamina may have dimensions ranging from about 40 $\mu m$ to 250 $\mu m$ high and from about 150 $\mu m$ to about 100 cm wide, such as from about 50 $\mu m$ to about 200 $\mu m$ high and from about 200 $\mu m$ to about 100 cm wide. In some embodiments, the length of the microscale-based structure formed in, or defined by, the lamina may have dimensions ranging from about 40 $\mu m$ to about 100 cm in length. In yet other embodiments, the microscale-based structure can be in the form of channels having lengths and widths ranging from about 50 $\mu m$ up to millimeter or meter scale.

In particular disclosed embodiments, the device comprises one or more electrodes. The electrodes typically are provided as a thin layer of electrically conductive material and are referred to herein as an electrode layer. In some embodiments, the electrode layer may be modified with an enhanced surface area electrode material and placed on a lamina, such as an electrode lamina, and further associated with a lamina layer comprising the main flow pathway. For example, the pathway surface may be effectively associated with the electrode layer, such as by placing the electrode layer along the top surface of the main flow pathway. The electrode layer may also be provided along the top surface of the side channel walls. In yet other embodiments, the electrode layer may be provided within one or more pathways. The electrode/electrode layer also is electrically coupled to a power source.

In particular embodiments, the mass of ionic species captured and retained in the presence of an applied electrical potential is a parameter of the disclosed device that can be manipulated in order to increase device efficiency. In certain embodiments, the lower limit of the species capture is obtained by using a single electrode layer. Increasing the exposed surface area of the electrode increases the ability to capture ionic species; therefore, certain embodiments of the device use enhanced surface area electrode materials to increase the exposed electrode surface area compared to the nominal area of the electrode footprint, resulting in higher ion capture per charging cycle. By using the disclosed enhanced surface area electrode material, the number of cycles required to substantially purify the fluid passed through the device can be reduced, thereby increasing the energy efficiency of the device.

The enhanced surface area electrode material typically is a porous material that facilitates continuous flow of material through the device. The porous material may comprise one or more extensions of conductive material that extend from the electrode layer and may be positioned to extend into the main flow pathway, into the side flow paths defined by the side channels, and combinations thereof. In some embodiments, the extensions typically are nanostructures, and can have a wire-like structure that may be straight and/or coiled. In particular disclosed embodiments, the extensions are nanowires, such as nanosprings or nanograss. They may be made from an insulating material, such as silica. For certain disclosed embodiments, the coiled nanowires (e.g., nanosprings) have a diameter of greater than zero up to at least about 200 nm. In some embodiments, a coiled nanowire (e.g., a nanospring) may have a diameter of greater than about 30 nm for individual nanowires and up to at least about 200 nm for a coiled nanospring. The extensions may have a height of from about 1 µm to about 100 µm. In some embodiments, a plurality of extensions can be provided to form a bed of extensions. Such beds of extensions can have heights ranging from 50 µm to 250 µm on each electrode lamina. The extensions also are coated with an electrically conductive material, which is selected to be chemically inert and stable against chemical and electrochemical processes that may take place when the device is used. In some embodiments, the electrically conductive material can be graphene and other conductive forms of graphite. In particular disclosed embodiments, the electrically conductive material can be graphene made using the method described in PCT Publication No. WO2011/017338 and U.S. Patent Publication Nos. 2012/0228555 and 2014/0209480, the relevant portion of which is incorporated herein by reference. For example, the graphene can be made by heating a carbonaceous material and sulfur to a temperature and for a time effective to produce graphene. In particular embodiments, the carbonaceous starting material does not inherently comprise sulfur but is used in conjunction with a separate source of sulfur. In other embodiments, the carbonaceous starting material inherently comprises sulfur. In particular embodiments, the carbonaceous starting material, which either contains sulfur or is used in conjunction with a separate source of sulfur, is added to a first container. The first container can be used alone, or can be placed inside a second container. The second container and/or first container holding the carbonaceous starting material and sulfur is then maintained under a partially or completely inert atmosphere by methods known to a person of ordinary skill in the art to include covering the system, placing the system under an atmosphere of inert gas, or placing the system under pressure. The system containing the starting materials is heated to a temperature effective to produce graphene using a heat source. Heating is carried out for a time effective to produce graphene, typically from about greater than 0 to about 60 minutes; more typically from about 2 minutes to about 20 minutes. In disclosed embodiments the reaction vessel, which contains the carbonaceous starting material and sulfur, is heated for a range of time from about 5 minutes to about 8 or 10 minutes. Certain embodiments employ a cooling period ranging in time from about greater than 0 to about 60 minutes, more typically from about 4 minutes to about 10 minutes. After the system is covered, it is heated to temperatures effective to form graphene. In particular embodiments, the heat source can be an open flame or any device capable of producing temperatures effective to form graphene. A temperature effective to produce graphene can range from about 250° C. to about 1200° C.; more typically, the temperature ranges from at least about 600° C. to about 1000° C. Certain disclosed embodiments concern using temperatures ranging from about 700° C. to about ° C. A person of ordinary skill in the art will understand that the temperature and time effective to produce graphene may depend on the amount of starting material used.

The graphene material made using the method disclosed by PCT Publication No. WO2011/017338 and U.S. Patent Publication Nos. 2012/0228555 and 2014/0209480 has electrochemical and physical properties that lends its use to an electrically conductive material as disclosed herein. In particular disclosed embodiments, the graphene material has a substantially micro-crystalline grain size ranging from about 2.0 nm to about 15 nm, basal planes that are substantially planar, and exhibits an anodic potential of at least 2 volts to about 3 volts. In particular disclosed embodiments, the electrode layer and enhanced surface area electrode material are selected to be stable against corrosion caused by any of the fluids disclosed herein.

The extensions may be deposited, or they may be generated in-situ. These extensions provide the porous enhanced surface area electrode material that is utilized to isolate, or segregate, the ionic species within the fluid. Due to the porosity provided by the extensions of the electrode layer, they may be included in the device as part of the main flow path, as indicated herein. The overall porosity of the electrode layer may range from about 8% to about 99%, such as about 10% to about 98% (these percentages are defined as the ratio of open space to total nominal volume of space occupied by the electrode layer [i.e., the area that a planar electrode would occupy]). In particular disclosed embodiments, the amount of contaminants removed by each charging cycle depends on the effective enhanced surface area of the electrodes attracting the ions. The porosity of the extensions and the amount of surface enhancement provided within the device can both contribute to the number of ions that are effectively separated from the fluid. Device performance therefore can be improved by designing the device to have a balance between electrode material porosity and surface enhancement (e.g., the amount and placement of the extensions). The extensions provide a smooth surface free of voids and dead end pores. In particular disclosed embodiments, the high surface area electrode layer provides a minimum increase of 300 cm$^2$ total surface area using only a nominal 1 cm$^2$ surface footprint of the electrode layer.

The desired surface area increase can be predicted using the Gouy-Champan equation, which calculates the expected concentration of ionic species on the surface of an electrode contained within an ionic double layer as a function of applied electrical potential. Solely by way of example, the surface concentration of the ionic species may remain constant for a given potential and may utilize 1.5 volts of applied electrical potential thereby resulting in capture of about 2.5 mg/cm$^{-2}$ ionic species. This number may be increased using the increased surface area electrode material disclosed herein.

Embodiments of the disclosed device may further comprise a separation zone that facilitates separating fluids having high concentrations of contaminants from the bulk flow of purified fluids. The separation zone may be implemented into the device by designing the pathways of the lamina to comprise, or be fluidly integrated with, side channels as disclosed herein.

In certain embodiments, the device is designed to comprise one or more side channels in the separation zone. The side channels facilitate removal of contaminated fluid and typically are oriented perpendicular to the flow path of the main stream of fluid. Any number of side channels may be included and each side channel may be designed to direct fluid to one or more outlets through which the contaminated liquid may be expelled. The side channels also may be fluidly coupled to one or more valves used to control the flow dynamics of the microscale-based cell. In particular disclosed embodiments, the valve may be located on one side of the device and the exit channel may be located on an opposing side of the device. When the valve is closed, fluid flow directs the impure fluid, which was previously collected at the electrode, through the side channels leading to the exit channel.

FIG. 1 schematically represents the general concept of certain disclosed devices that utilize CDT. As illustrated in FIG. 1, a pathway-containing lamina 100 is effectively associated with an electrode layer 102 comprising a surface 104 associated with the enhanced surface area electrode material 106. A fluid 108, comprising charged species 110 and 112, flows into the device. Charged electrode layer 102 and enhanced surface area electrode material 106 attract ions 110 and 112 of opposite charge to substantially segregate charged ions adjacent the electrode layers. This ion segregation substantially reduces the concentration of the ions in the main flow pathway 114 and increases the concentration of ions in the separation zone 116. Charged contaminants collect in the separation zone 116 thereby effectively separating these ionic species 110 and 112 from the fluid 108, and providing a substantially reduced concentration of charged species in the fluid.

Figure 2:
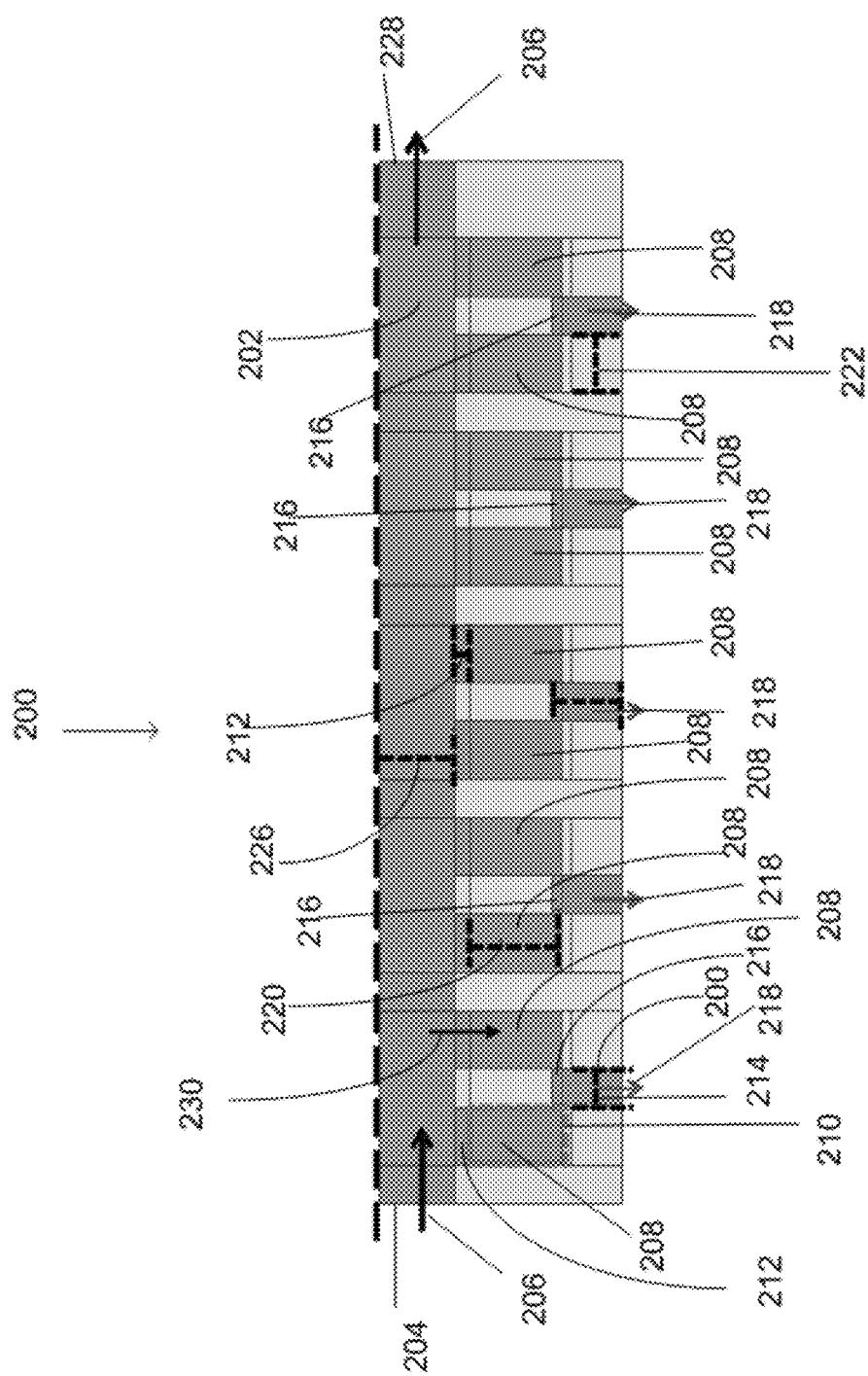
FIG. 2 is a schematic cross-sectional view of different flow paths of certain disclosed embodiments of the device.

FIG. 2 is a cross-sectional drawing exemplifying dimensions of the various components of a particular embodiment 200 of the device. Fluid 202 (represented by shaded regions) enters a main flow pathway 204 via flow path 206. A plurality of side channels 208 are fluidly coupled with the main flow pathway 204. Each side channel 208 may comprise an enhanced surface area electrode material 210, which is positioned away from the main flow pathway 204 by a suitable distance 212. The distance 212 is chosen in order to prevent ions from repopulating the main flow pathway 204. In particular embodiments, the distance is selected to be about 10 µm. A person of ordinary skill in the art will recognize that the enhanced surface area electrode material 210 may be provided in any or all of the side channels 208, even though only one is illustrated in FIG. 2. Two side channels 208 are fluidly coupled to an outlet 214 that is designed to have a portion 216 that overlaps with the side channels to facilitate fluid flow 218 through the outlet. The side channels 208 may be designed to have a suitable flow distance 220 and width 222. The flow distance is selected to provide effective separation of the ions separated from flow path 206. The outlet 214 is designed to have a flow length selected to effectively expel the ions from device 200. The main flow pathway 204 also is designed to have a suitable width 226 to allow a sufficient amount of fluid 202 to flow through the main flow pathway 204. Fluid 202 flows through flow path 206 and exits the device through exit port 228.

During pulsed flow operation of device 200, side flow 230 sweeps ions collected near the enhanced surface area electrode material 210 to fluid flow 218. Side flow 230 increases and flow of fluid 202 through main flow pathway 204 decreases when there is reduced or substantially no applied potential. This change in flow dynamics and chemical potential allows ionic species, which are accumulated on and released from the enhanced surface area electrode material 210 during charging and discharging cycles (respectively), to be flushed through side channels 208 and outlet 214.

Figure 3:
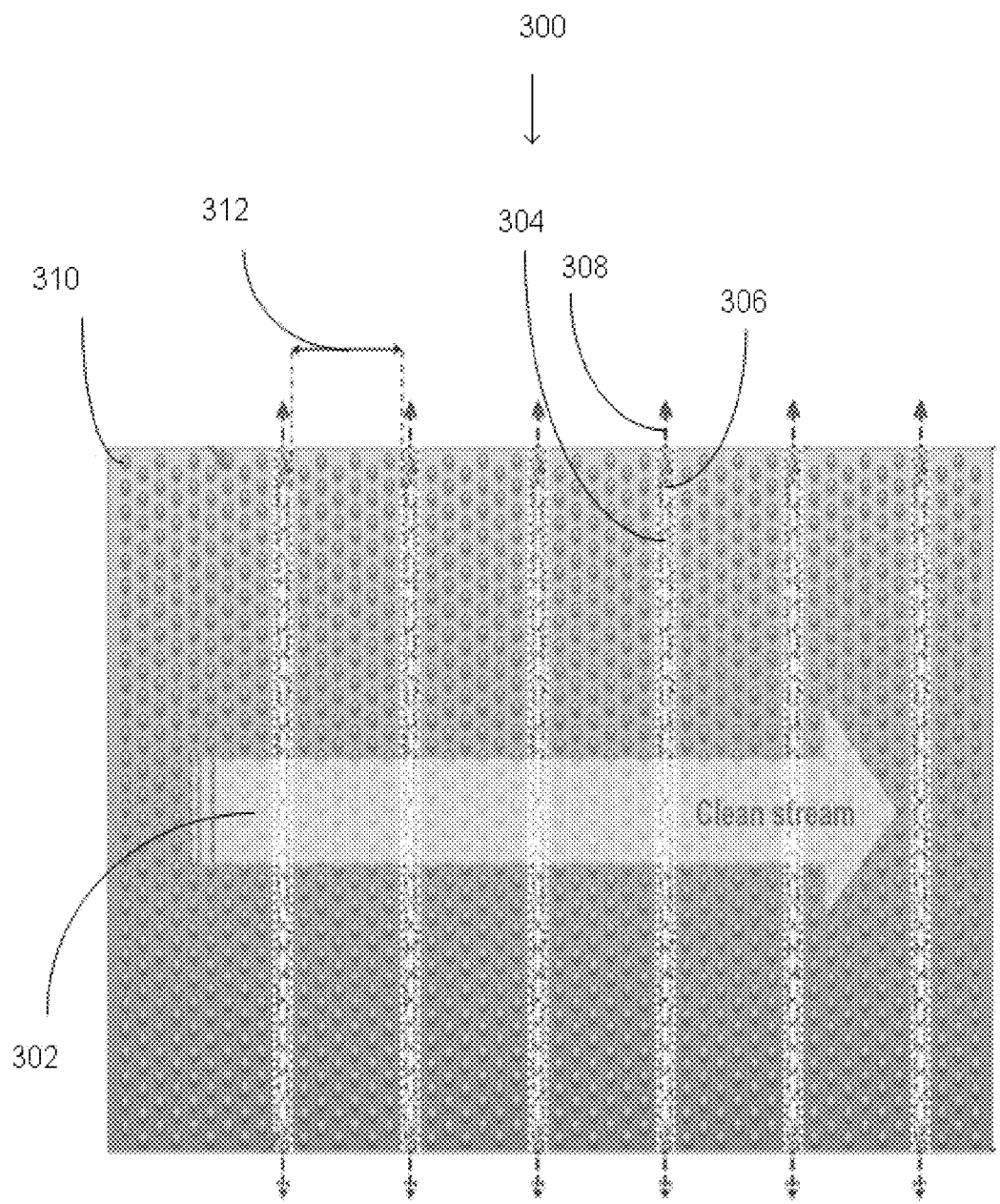
FIG. 3 is a schematic top plan view of a particular embodiment of the disclosed device.

With reference to FIG. 3, fluid flows through device 300 via flow path 302. Multiple side channels 304 comprise enhanced surface area electrode material 306. Ions accumulate on the enhanced surface area electrode material 306 when the power source (not shown) is on. When device 300 is operated at minimal or substantially no potential, the ions are forced through side channels 304 via flow path 308. Multiple pillars 310 also are included in device 300, which may have any shape effective to provide structural stability of stacked lamina. The side channels 304 may be separated by a suitable distance 312. The distance 312 is selected to minimize electrical interference between the side channels 304.

Figure 4:
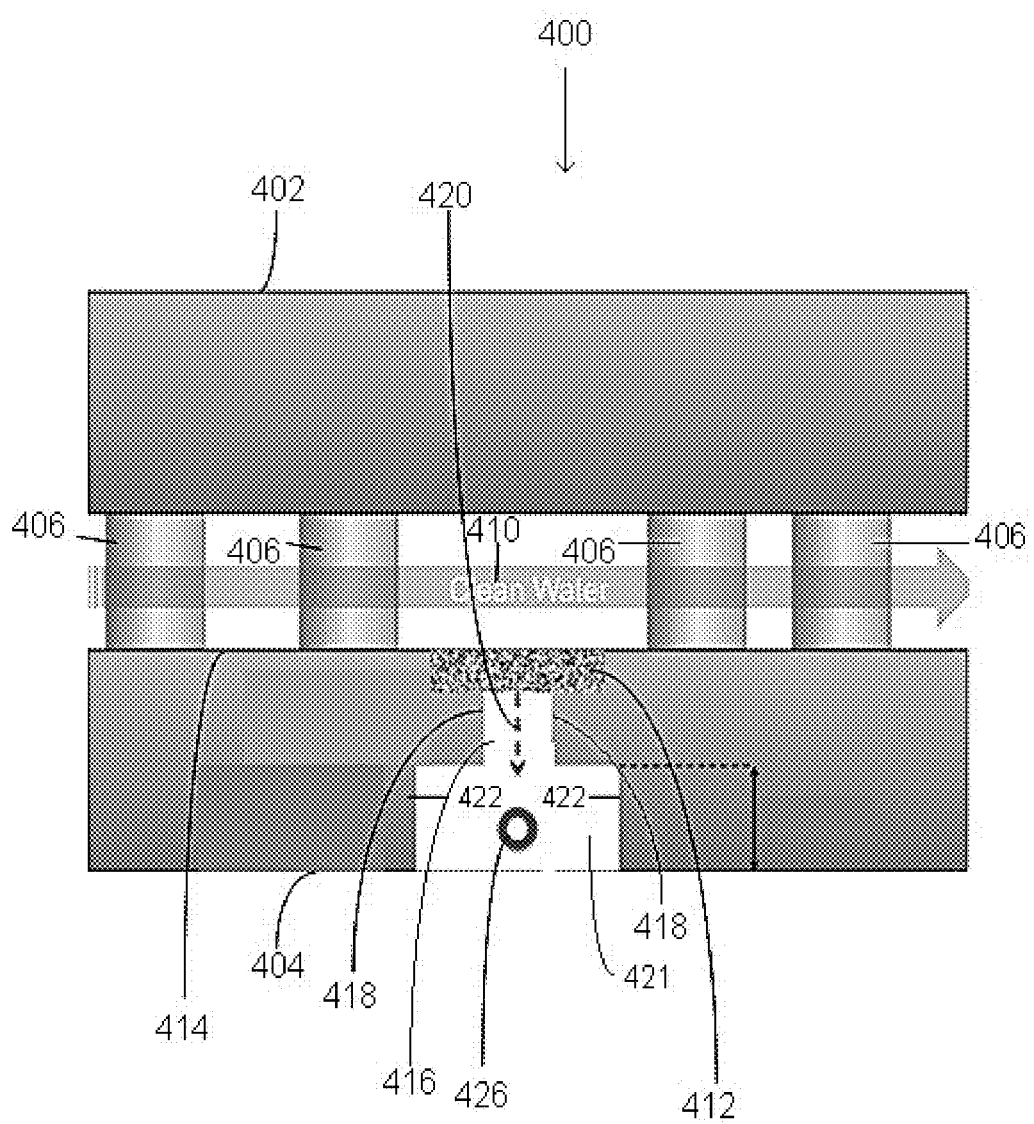
FIG. 4 is a schematic cross-sectional view of the device illustrated in FIG. 3.

Another embodiment of the device is illustrated in FIG. 4. Device 400 comprises a cover lamina 402 and an electrode-containing lamina 404. Cover lamina 402 is supported by pillars 406. Fluid flows through device 400 via flow path 410. The electrode-containing lamina 404 comprises enhanced surface area electrode material 412, which, in this embodiment, is positioned flush with a top surface 414 of the electrode-containing lamina. A side channel 416 is defined by sidewalls 418 and contaminants flow via flow path 420 into a separation zone 421 defined by side walls 422, which may be about 50 µm wide in some embodiments. Contaminants are expelled via outlet 426.

Figures 5A, 5B:
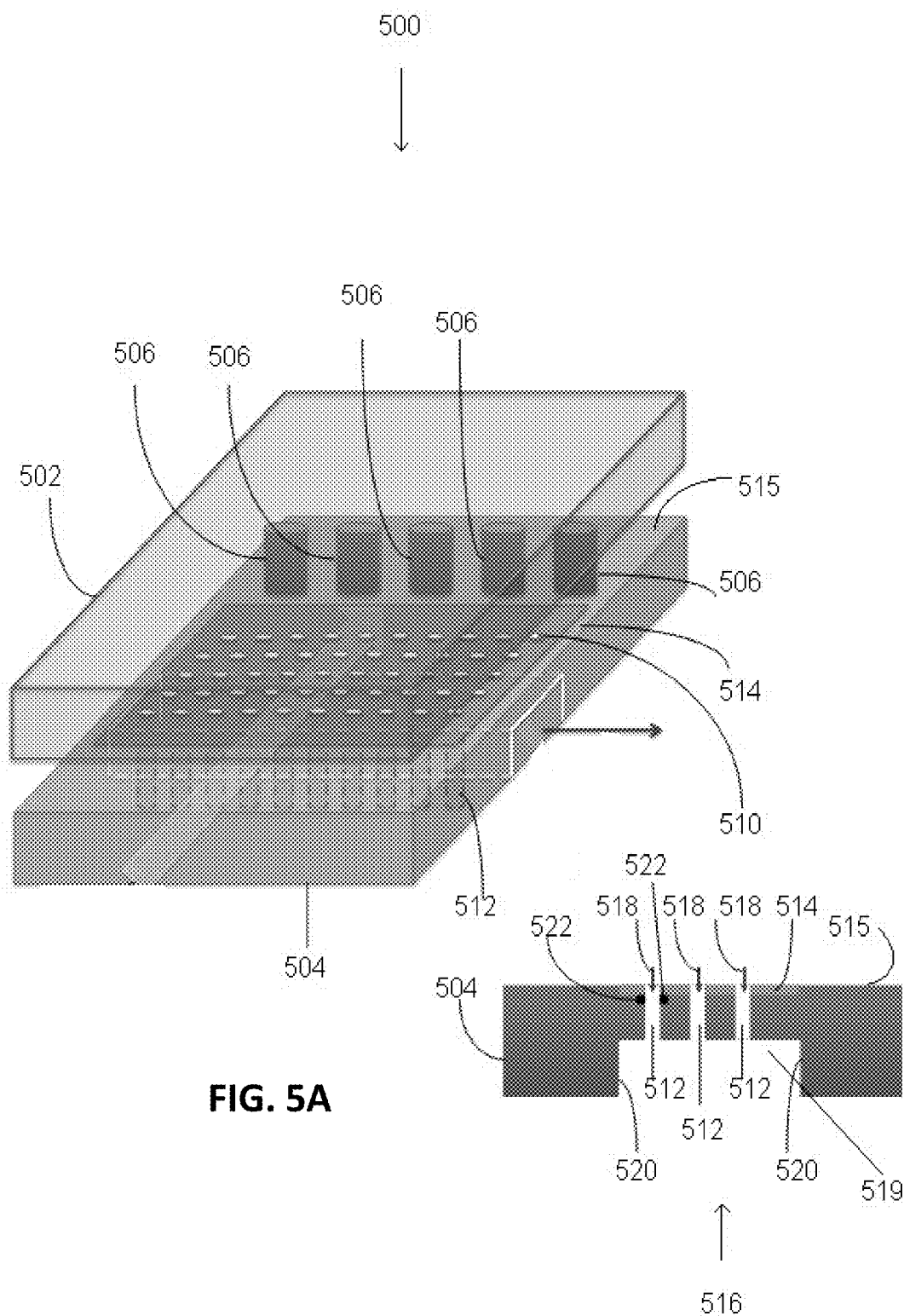
FIGS. 5A and 5B illustrate another embodiment of the disclosed device.

Device 500, illustrated in FIG. 5A (with an expanded view of particular aspects provided by FIG. 5B), comprises a cover lamina 502, which is supported by pillars 506. Electrode-containing lamina 504 comprises multiple openings 510, which serve as conduits to the side channels 512 that are formed within the electrode-containing lamina. Multiple openings 510 are coupled with a layer of the enhanced surface area electrode material 514. In this embodiment, electrode material 514 is positioned flush with a top surface 515 of the electrode-containing lamina 504. See, for example, enlarged cross section 516, illustrated in FIG. 5B, which further illustrates the position of the enhanced surface area electrode material 514 in relation to side channels 512. As illustrated in cross section 516, side channels 512, through which contaminants can flow via flow path 518, open into a separation zone 519 defined by side walls 520. Side channels 512 can include multiple sensors 522. In certain embodiments, sensors 522 determine the level of contaminants flowing through side channels 512 and thereby control when the charging cycle should be discontinued and the discharging cycle initiated.

Figure 6:
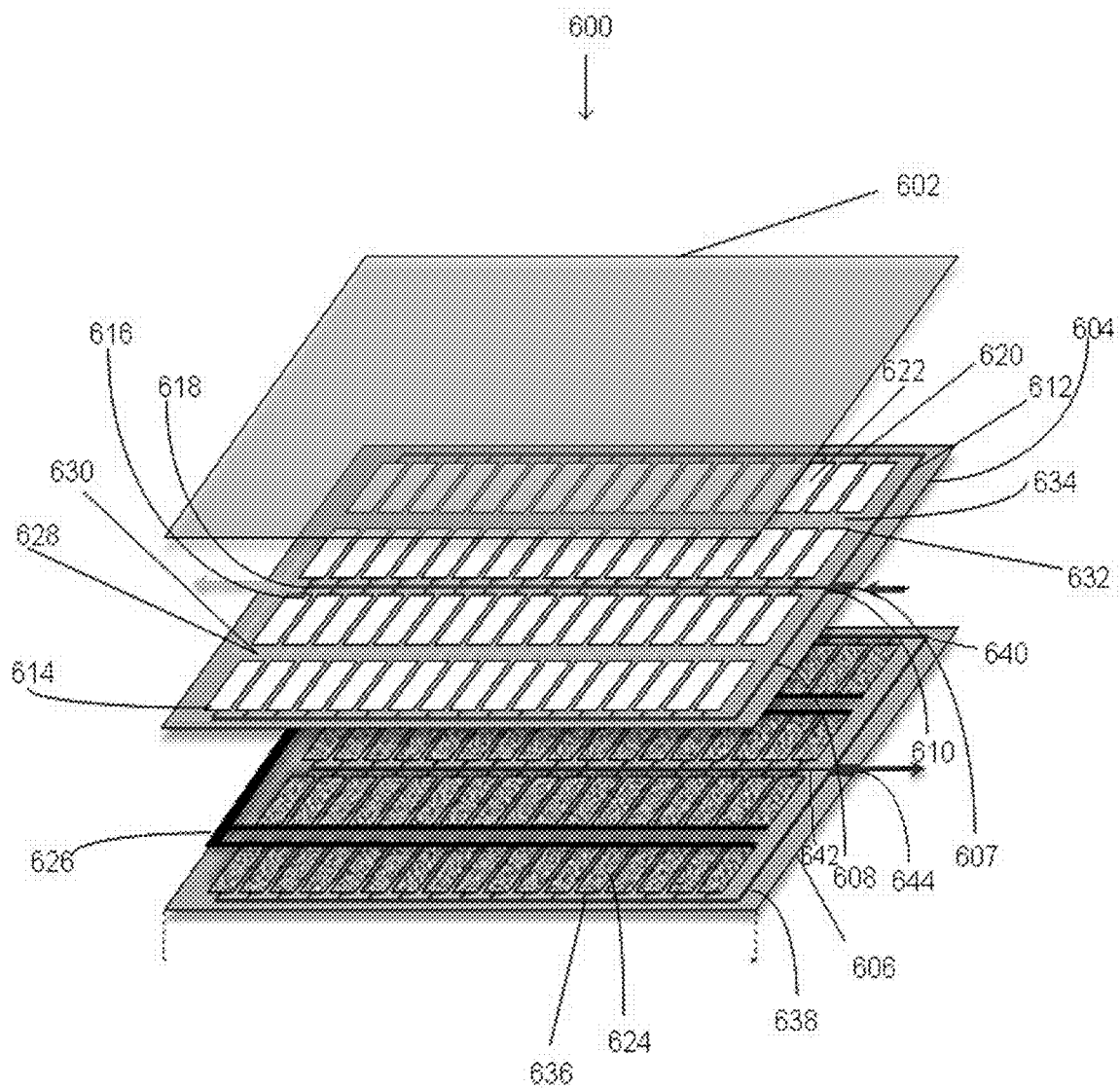
FIG. 6 is a schematic exploded perspective view of a single stage device.

A single stage device that is operated in parallel is illustrated in FIG. 6. Device 600 comprises a cover lamina 602, a fluid lamina 604, and an electrode-containing lamina 606. Fluid lamina 604 is designed to have an inlet 607, through which impure fluid is introduced into the device. The fluid flows via divergent flow paths 608, 610, and 612. Each divergent flow path 608, 610, and 612 is fluidly coupled to at least one side channel (614, 616, 618, or 620). Side channels 614, 616, 618, and 620 deliver fluid to a plurality of open slits 622 in lamina 604. Open slits 622 are configured to allow fluid, and ions contained therein, to contact the enhanced surface area electrode material 624 that is provided on the electrode-containing lamina 606. In particular disclosed embodiments, the open slits 622 are configured to accommodate the electrode material 624, which becomes integrated with the slits as the fluid lamina 604 and electrode-containing lamina 606 are assembled. As disclosed herein, the enhanced surface area electrode material 624 can be flush with the top surface (not illustrated) of fluid lamina 604, it may be below the top surface (not illustrated) of the fluid lamina 604, or it can be positioned so that it extends above the top surface (not illustrated) of fluid lamina 604. Charged ionic species are extracted from the fluid in the open slits 622 when the electric layer 626 is turned off, at which point the fluid is expelled through exit channels 628, 630, 632, and 634. The contaminants collected on the enhanced surface area electrode material 624 are flushed through exit channels 636 within the electrode-containing lamina 606. The exit channels 636 direct the fluid, via convergent flow paths 638, 640, and 642, out of the device. Electrode layer 626 and enhanced surface area electrode material 624 are powered and depowered simultaneously and the pulsed flow is applied uniformly across the entire lamina. The pulsed flow and the powering/depowering of the electrode 626 and enhanced surface area electrode material 624 are synchronized with an appropriate frequency offset that maximizes the mass of contaminants removed via flow paths 638, 640, and 642, minimizes fluid removed these flow paths, and maximizes purified water that is passed through the main flow paths 608, 610, and 612.

Figure 7:
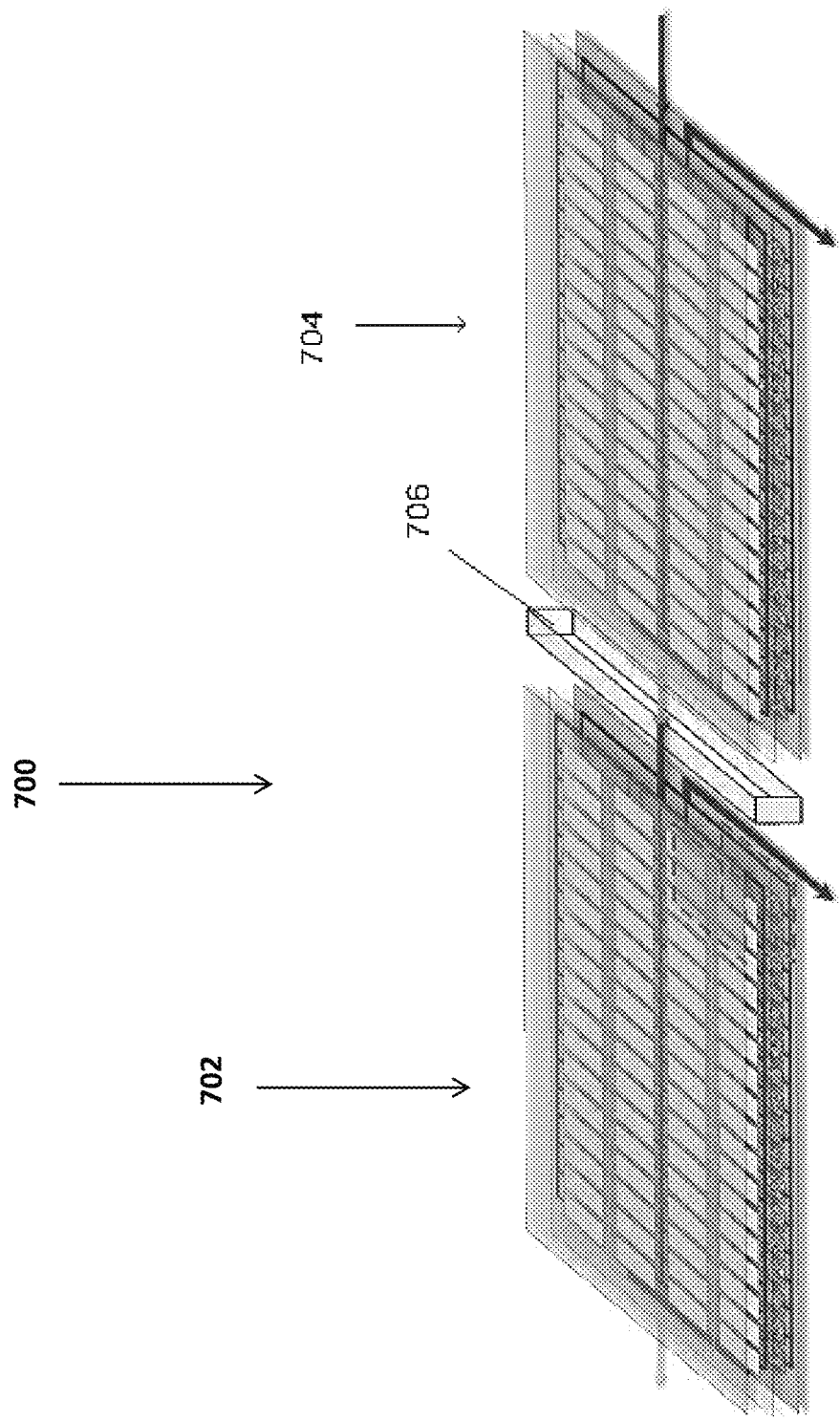
FIG. 7 is a schematic exploded perspective view of an embodiment of the disclosed device wherein two device cells are fluidly coupled through an accumulation tank.

A multi-stage embodiment is illustrated in FIG. 7. Two device cells, 702 and 704 (having components similar to those illustrated in FIG. 6), are fluidly coupled to an accumulation tank 706 to provide multi-stage device 700. The accumulation tank 706 serves as a storage component into which semi-purified fluid is emptied via an outlet, such as outlet 644 of FIG. 6. The accumulation tank 706 thereby serves as a fluid source for the next device cell 704 of the entire device 700. The device illustrated in FIG. 7 is not limited to only two device cells and one accumulation tank, as certain disclosed embodiments may have more than the two device cells 702 and 704 arranged in series, with an accumulation tank 706 positioned between each individual device cell. Each of the device cells 702 and 704 may be identical or may have a different structural configuration, and may be operated using the same or different operating parameters from each other Impure fluid flowing through device 700 has a decreasing concentration of contamination as it proceeds from device 702 to 704, etc., and therefore may require a shorter duration charge cycle in each subsequent stage. As indicated above, in order to (1) maximize the amount of impure water passed through each stage, (2) minimize the amount of water rejected in the impure fluid stream, and (3) maximize the mass of impurities rejected in the impure fluid stream, the frequency of the pulsing flow and frequency and amplitude of powering and depowering cycle is adjusted differently than at the previous stage. For these reasons, in some embodiments, the operation of device 702 and device 704 should be decoupled, both forward and backward, thus allowing for independent optimization of each particular stage of operation.

Figure 8:
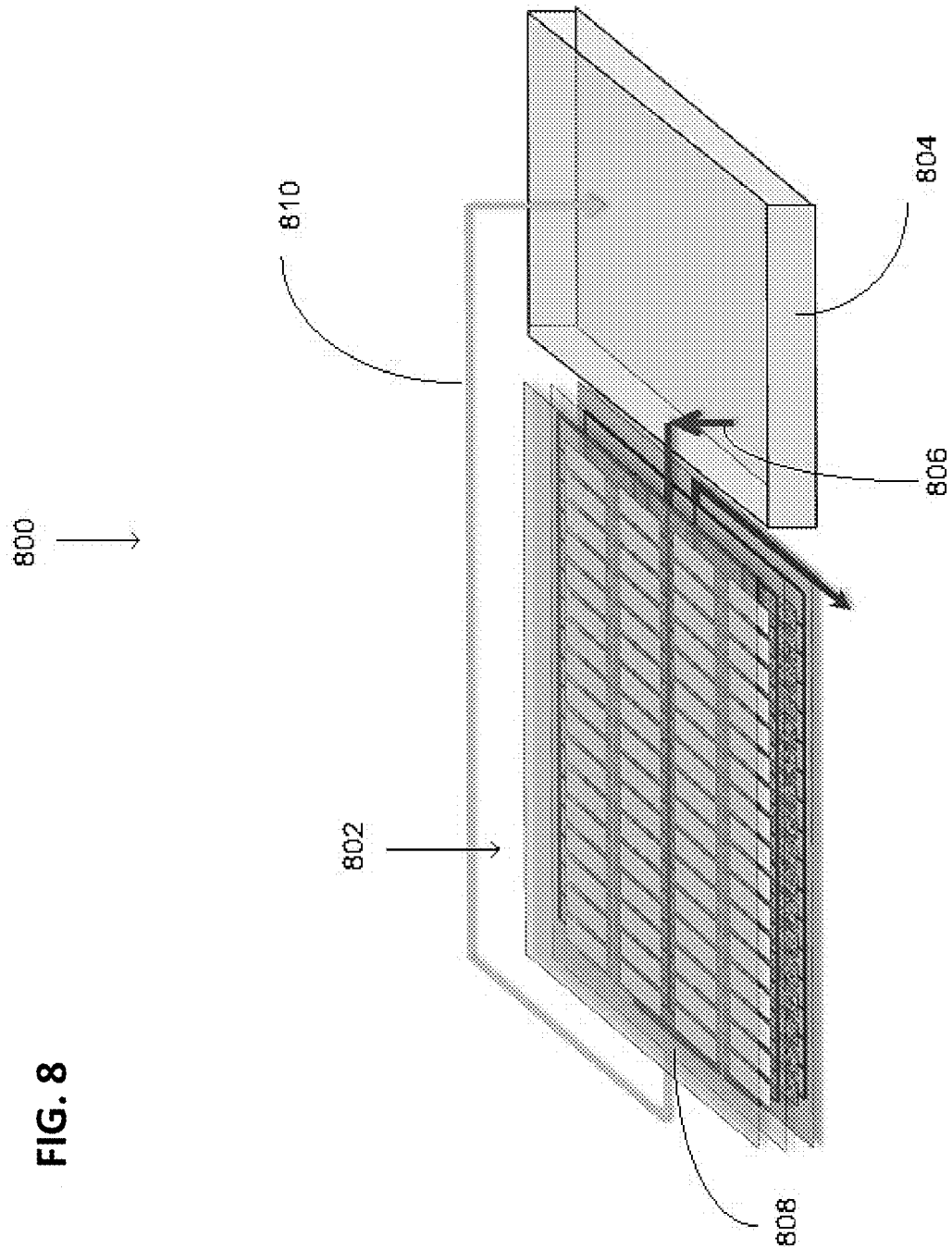
FIG. 8 is a schematic exploded perspective view of an embodiment of a single stage device comprising a single accumulation tank.

In another embodiment, the device may comprise a single accumulation tank and single device. The device 800 illustrated in FIG. 8 comprises a device cell 802 and a single accumulation tank 804. Fluid from accumulation tank 804 enters the device cell 802 via fluid path 806 and passes through a similar processing stage as disclosed herein (for example, as illustrated in FIG. 6). Fluid that is expelled through outlet 808 is redistributed into accumulation tank 804 via flow path 810. Fluid therefore may be processed multiple times in order to obtain higher purity fluid.

Figure 9A:
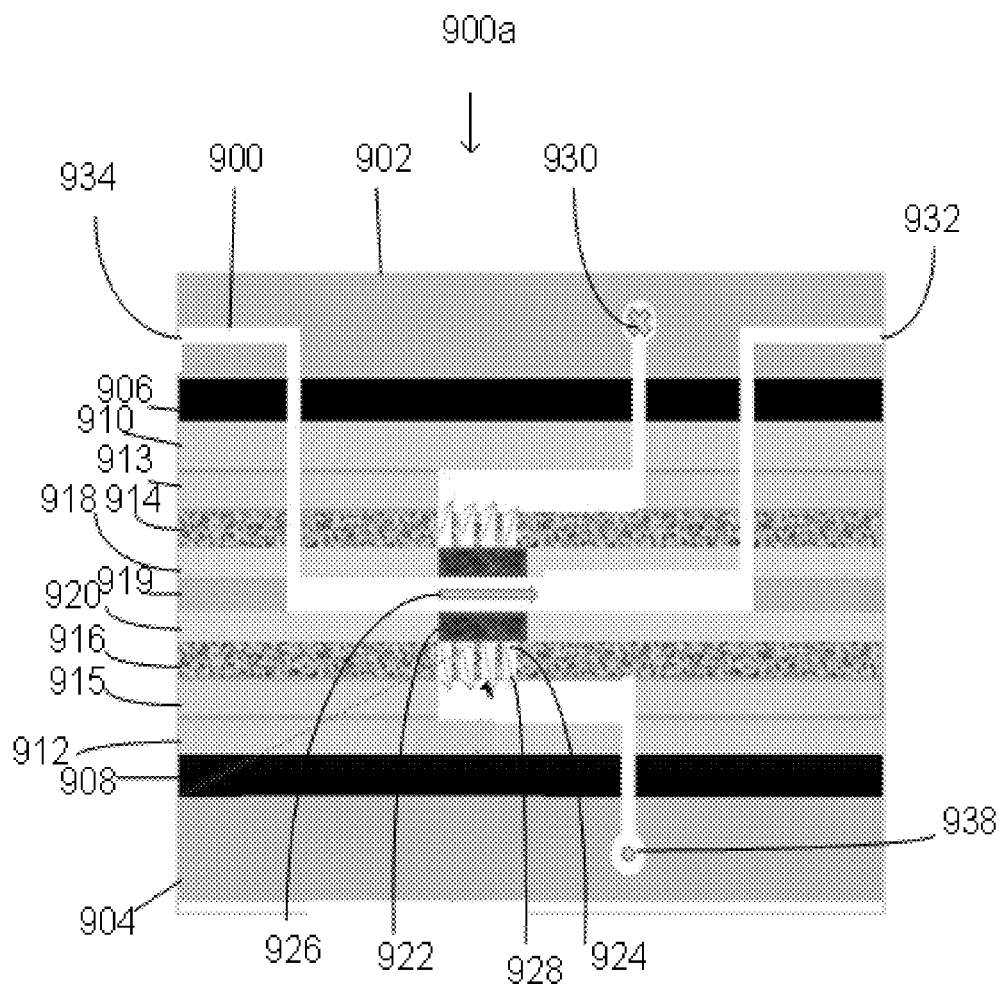
FIGS. 9A-9C are schematic cross-sectional views of various embodiments of the disclosed device.
Figure 9B:
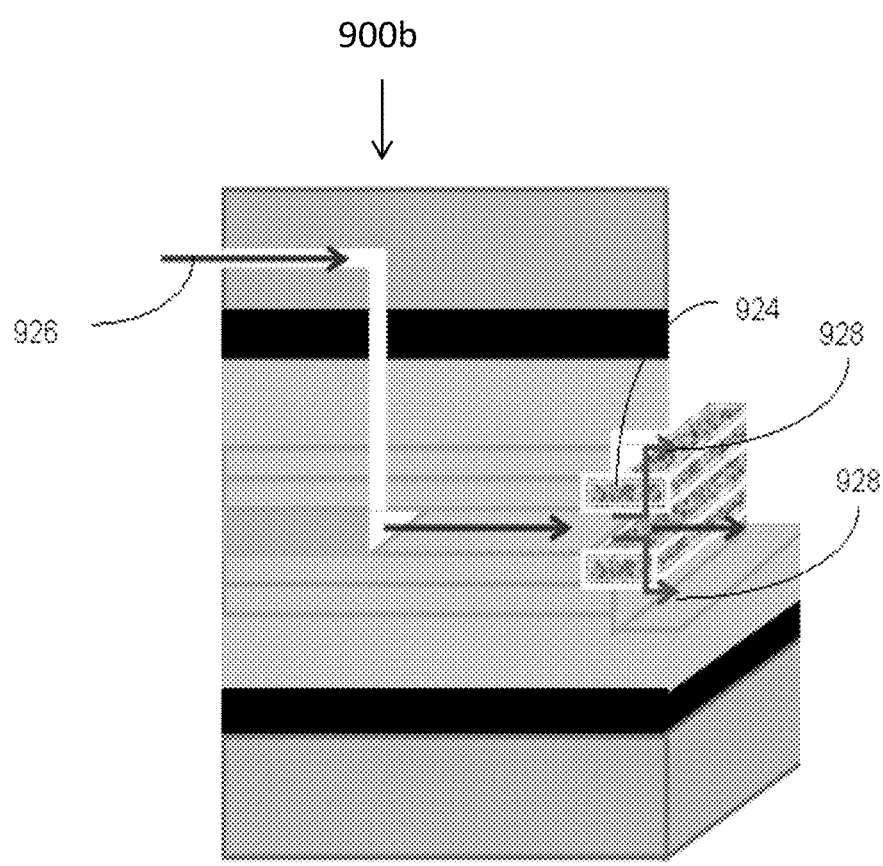
Figure 9C:
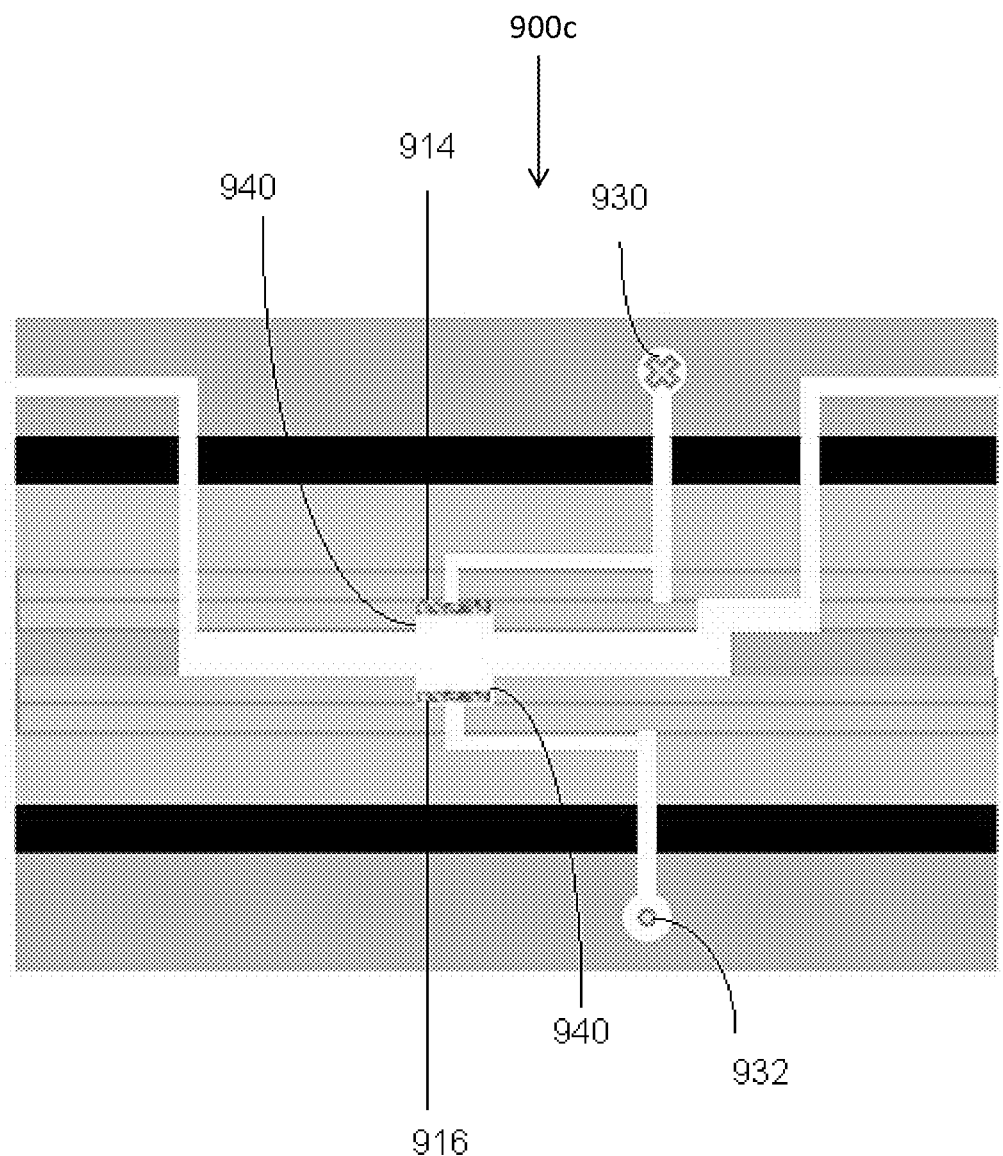
Figure 12:
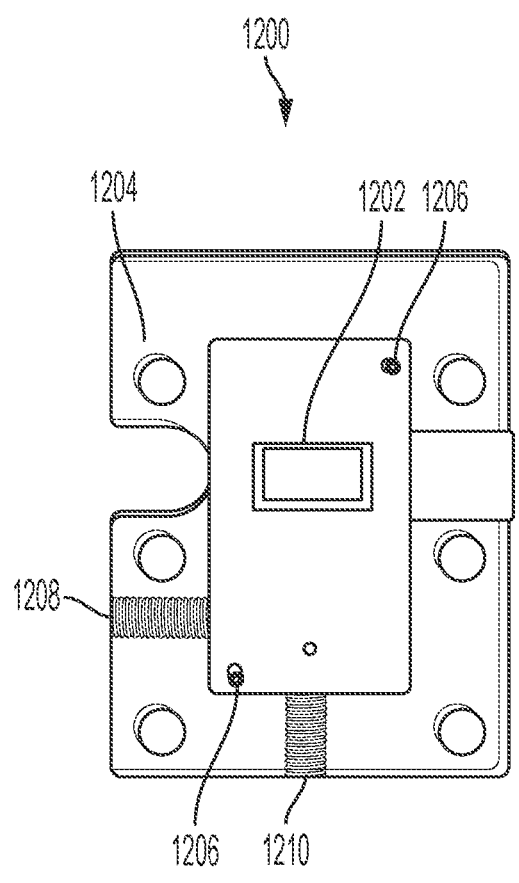
FIG. 12 is a photographic top plan view image of a particular embodiment of the disclosed device comprising a nanospring frame.

Disclosed devices can comprise multiple lamina layers comprising various different materials. A particular embodiment comprising plural different lamina layers is illustrated in FIG. 9A. Device 900*a* comprises a clamping fixture top 902 and bottom 904. Clamping fixture top 902 and clamping fixture bottom 904 are coupled to a first polymer layer 906 and 908, respectively. Polymer layers 906 and 908 are made of a polymeric material but could be made from any suitable lamina material disclosed herein. Polymer layers 906 and 908 are also coupled to second polymer layers 910 and 912, respectively, which can be made of the same or different material as the first polymer layers 906 and 908. In device 900, the second polymer layers are made from PEI. A third polymer layer also is illustrated in FIG. 9A, such as layers 913 and 915. Coupled to the third polymer layers 913 and 915 are electrode layers 914 and 916, which typically were made out of graphite in working embodiments, but could be made from any conductive material. Electrode layers 914 and 916 are enclosed with frame materials 918 and 920. Frame material layers 918 and 920, which may be separated by a fourth polymer layer 919, are configured to accommodate the enhanced surface area electrode material 922, which is designed to have a sufficient porosity to allow ionic species to enter the pores of the material and also to flow through the material once the applied potential is discontinued. Electrode layers 914 and 916 form side channels 924, which allow ionic species to flow away from the main flow pathway 926 via side flow paths 928. The device 900*a* further comprises a valve 930, which is opened and closed during pulsed flow operation. Ionic species swept away from main flow pathway 926 are expelled through outlet 932. Thus, as fluid enters inlet 934 and flows through the main flow pathway 926, it is substantially deionized and fluid having reduced concentration of ionic contaminants is expelled from outlet 932, while contaminants are expelled through outlet 938. Another view (900*b*) of device 900 is provided in FIG. 9B, which provides a cross-sectional view of the side channels 924, side flow paths 928, and main flow path 926. FIG. 9C illustrates a similar embodiment 900*c*. As illustrated in FIG. 9C, however, the electrode layers 914 and 916 are provided within side channels 940. Similar polymeric lamina layer components are used in device 900*c*, as are valve 930 and outlet 932.

The features of certain embodiments of the disclosed enhanced surface area electrode are illustrated in FIG. 10 and FIGS. 11A and 11B. As illustrated in the cross-section 1000 of FIG. 10, a portion of lamina 1002 is coupled to electrode layer 1004 and extensions 1006. The extensions 1006, which in some embodiments are nanosprings, can extend vertically and/or sideways and eventually form the enhanced surface area electrode material, which can span over and within (not illustrated) the side channels 1008. The enhanced surface area electrode material is further illustrated in embodiment 1100 (FIGS. 11A and 11B). The magnified view of FIG. 11B illustrates the web-like nature of the enhanced surface area electrode material 1102 and how it can extend into channels 1104.

Figure 13:
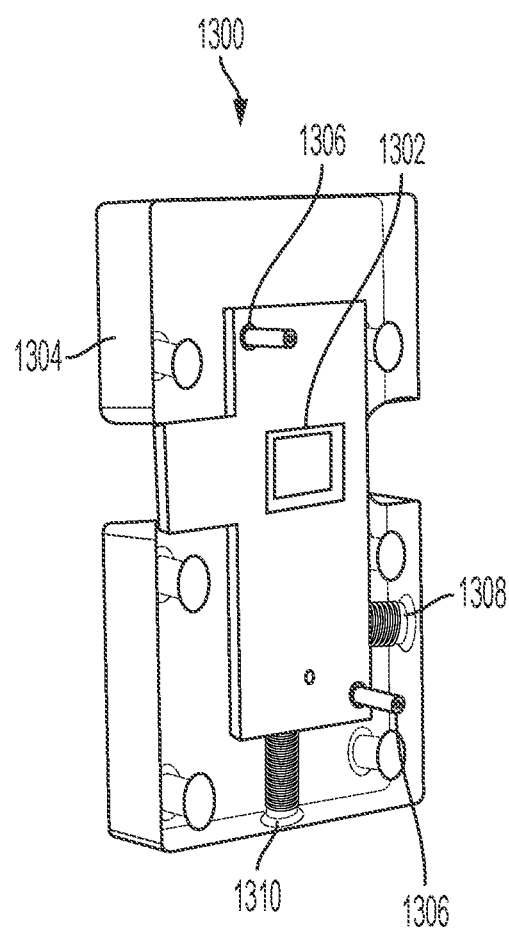
FIG. 13 is a photographic perspective view image of a particular embodiment of the disclosed device comprising a nanospring coating.
Figure 14:
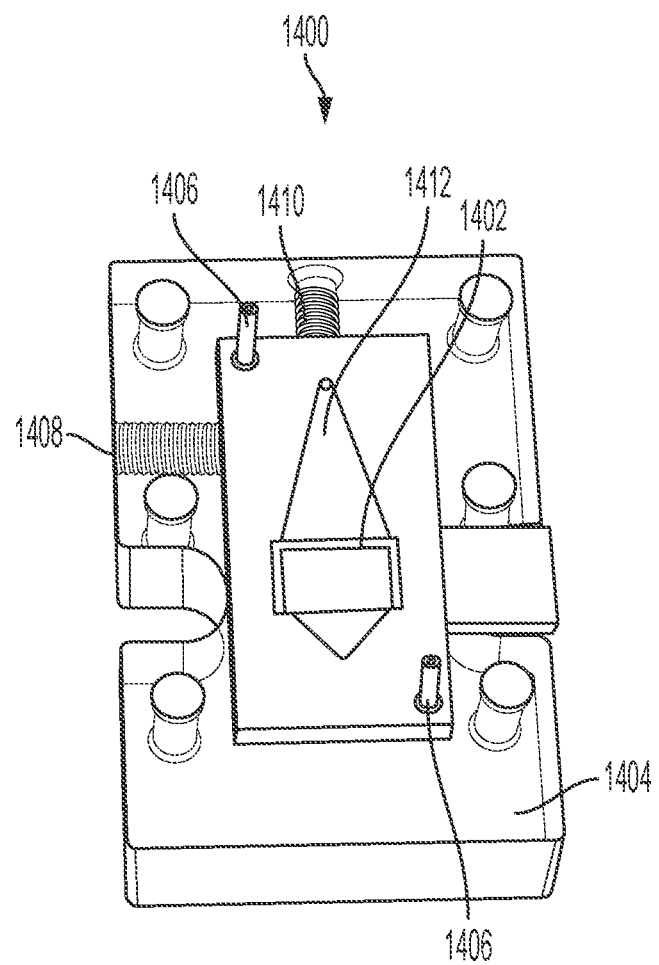
FIG. 14 is a photographic top plan view image of a particular embodiment of the disclosed device.
Figure 15:
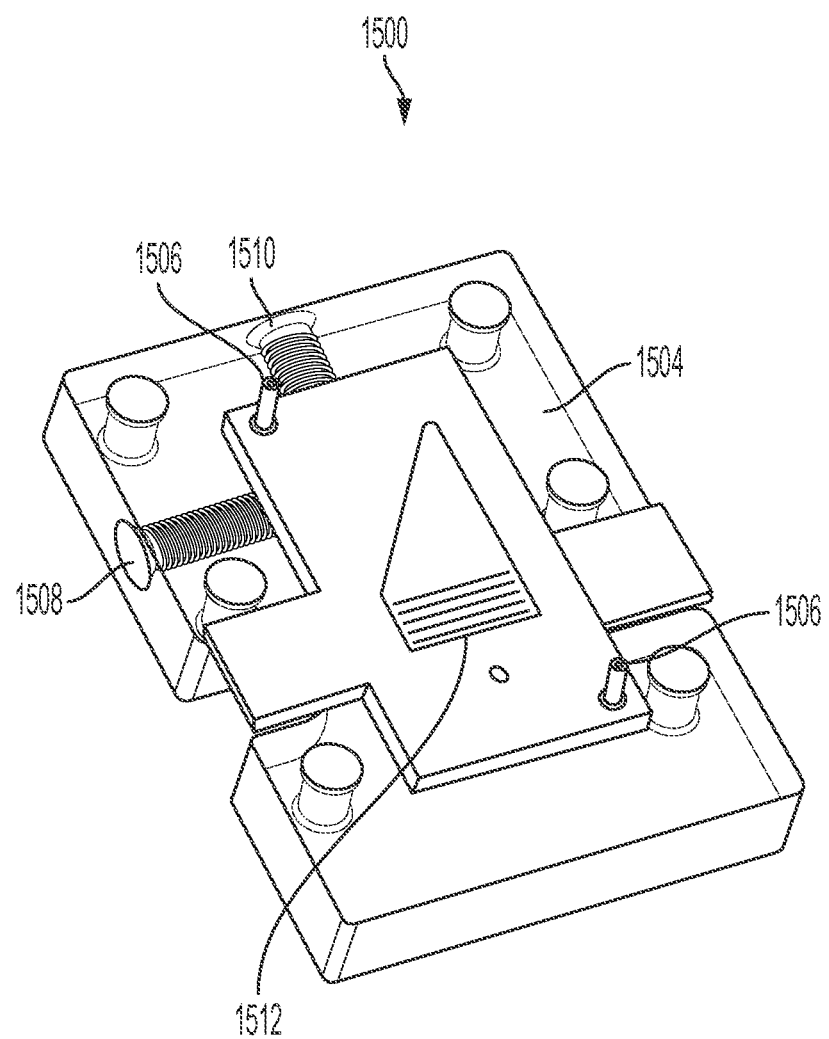
FIG. 15 is a photographic top plan view image of a particular embodiment of the disclosed device.
Figure 16:
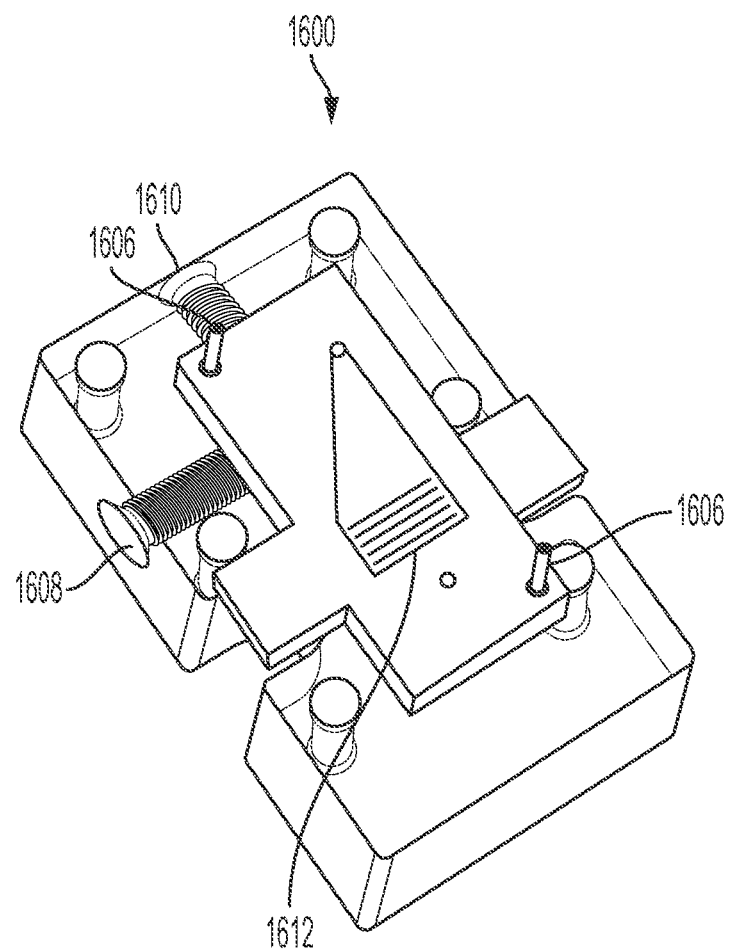
FIG. 16 is a photographic top plan view image of a particular embodiment of the disclosed device.

Photographic images of exemplary working embodiments are provided by FIGS. 12-16. Device 1200 comprises a nanograss frame 1202, a clamping fixture 1204, non-conducting alignment pins 1206, and ports 1208 and 1210. A similar embodiment is shown in FIG. 13, which also has a nanograss frame 1302, a clamping fixture 1304, alignment pins 1306, and ports 1308 and 1310. FIG. 14 shows device 1400, which comprises similar components, such as a nanograss frame 1402, clamping fixture 1404, alignment pins 1406, and ports 1408 and 1410, and further shows main flow pathway 1412. FIG. 15 shows a device 1500 having similar components, such as a clamping fixture 1504, alignment pins 1506, and ports 1508 and 1510, and further showing side flow channels 1512. FIG. 16 shows a similar structure comprising an additional transparent lamina.

Figure 17:
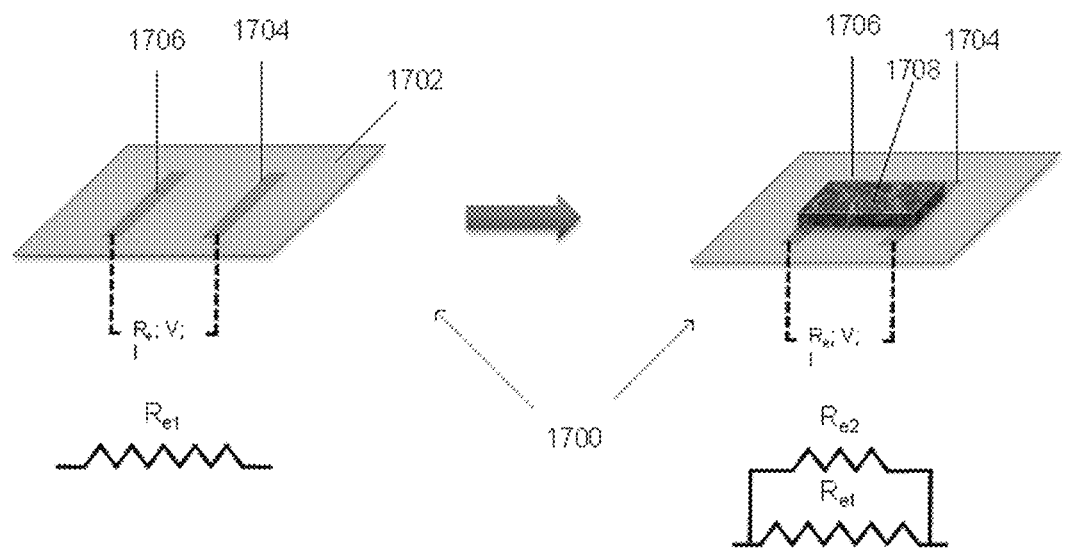
FIG. 17 is a schematic perspective view of an embodiment of the disclosed device used for dry tests.
Figure 18:
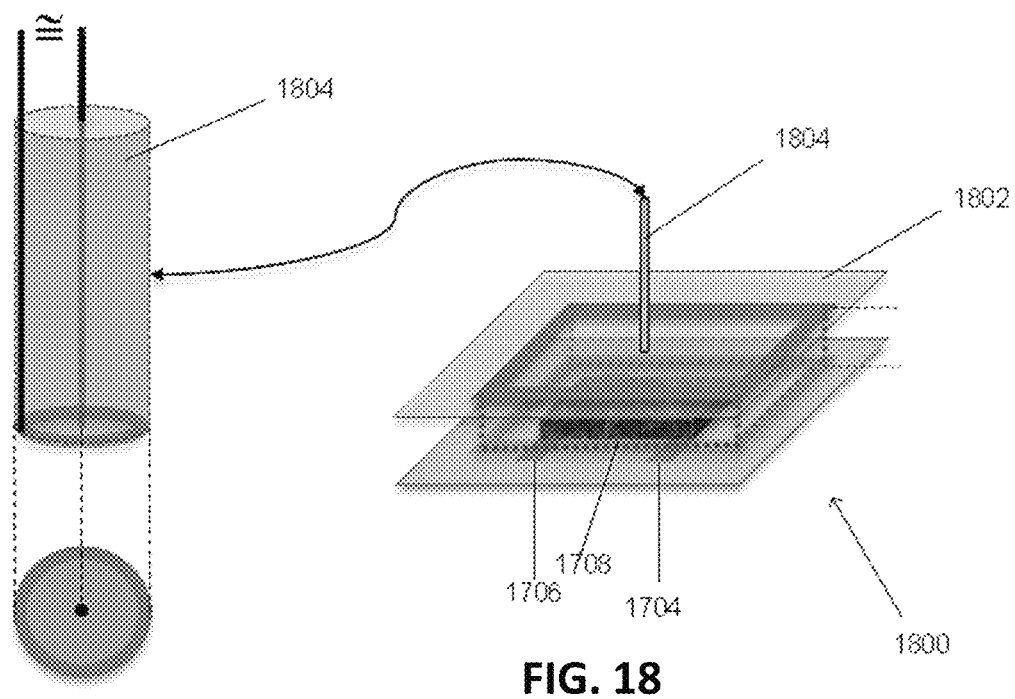
FIG. 18 is a schematic perspective view of an embodiment of a batch device as disclosed herein using a conductometer probe.

A test device may be constructed in order to test for direct and indirect measurements of CDT variables (e.g., salt concentration, water flow rate, pressure and pressure drop, voltage, current, electrode resistance, cell resistance, capacitance, nominal electrode surface area, and electrode height) and parameters (e.g., cell dimensions, electrode dimensions, electrode surface area enhancement, electrode porosity). A dry test device is illustrated in FIG. 17. Dry test device 1700 comprises a glass slide 1702 having at least two electrodes 1704 and 1706 attached thereto and further comprising an enhanced surface area electrode material comprising extensions (e.g., nanosprings) 1708. Test device 1700 may be modified to provide a batch CDT cell device 1800 as illustrated in FIG. 18. Device 1800 comprises a cell box 1802 that surrounds the electrode components and provides a reservoir into which a conductivity microprobe 1804 may be placed for taking measurements.

Figure 19:
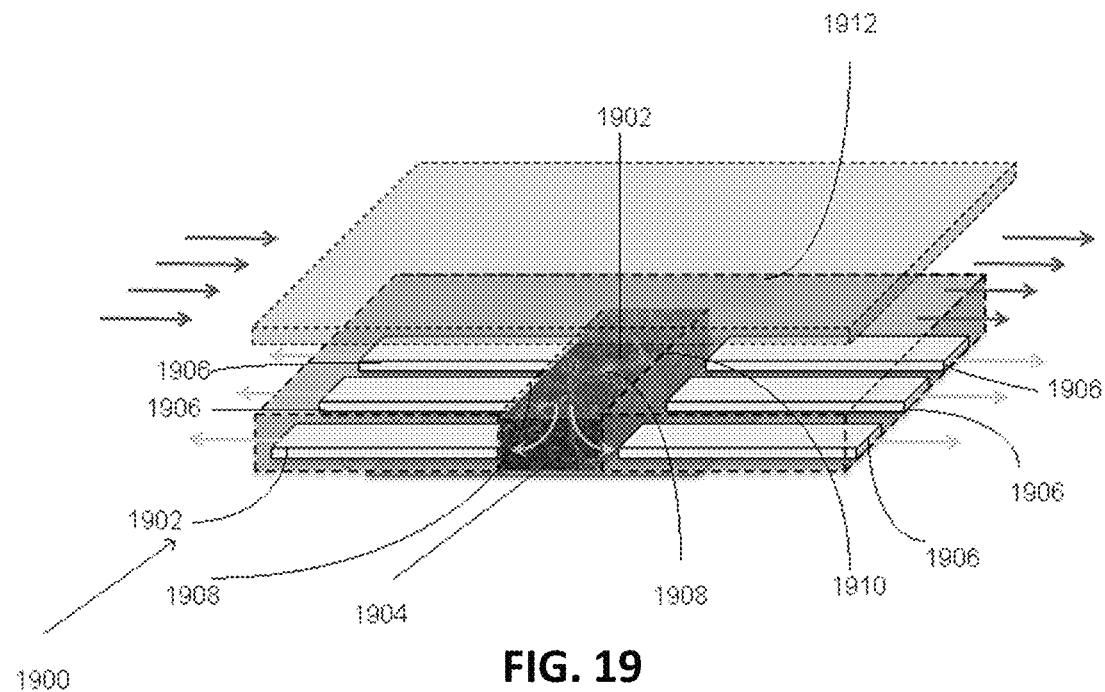
FIG. 19 is a schematic exploded perspective view of an embodiment of the device wherein the enhanced surface area electrode material is positioned to be substantially flush with a top surface of a side channel.
Figure 20:
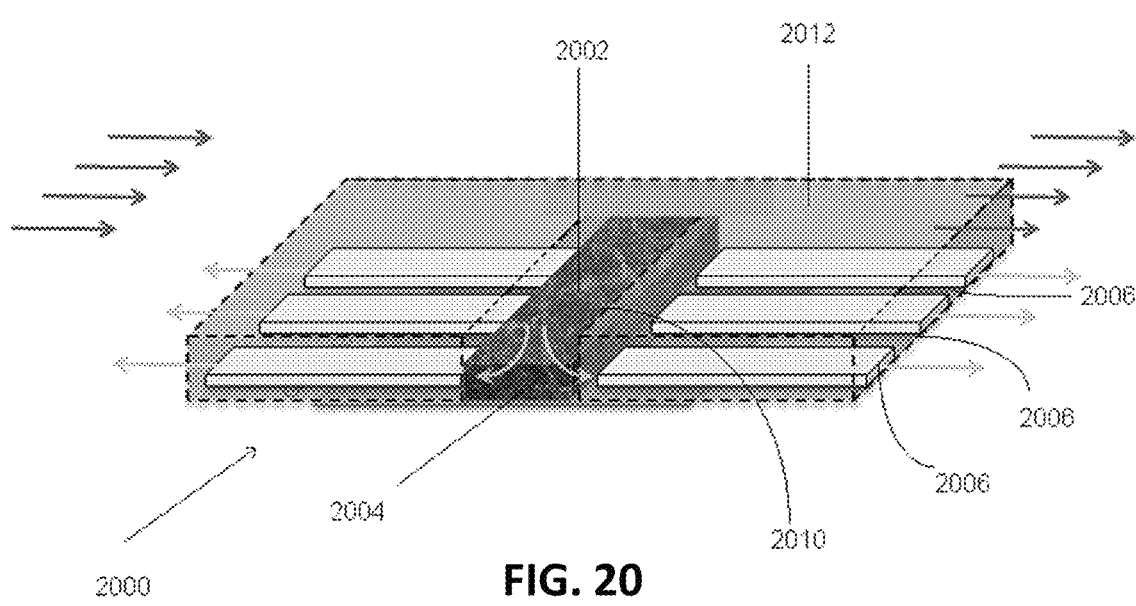
FIG. 20 is a schematic exploded perspective view of an embodiment of the device wherein the enhanced surface area electrode material is positioned below the top surface of the side channel opening.
Figure 21:
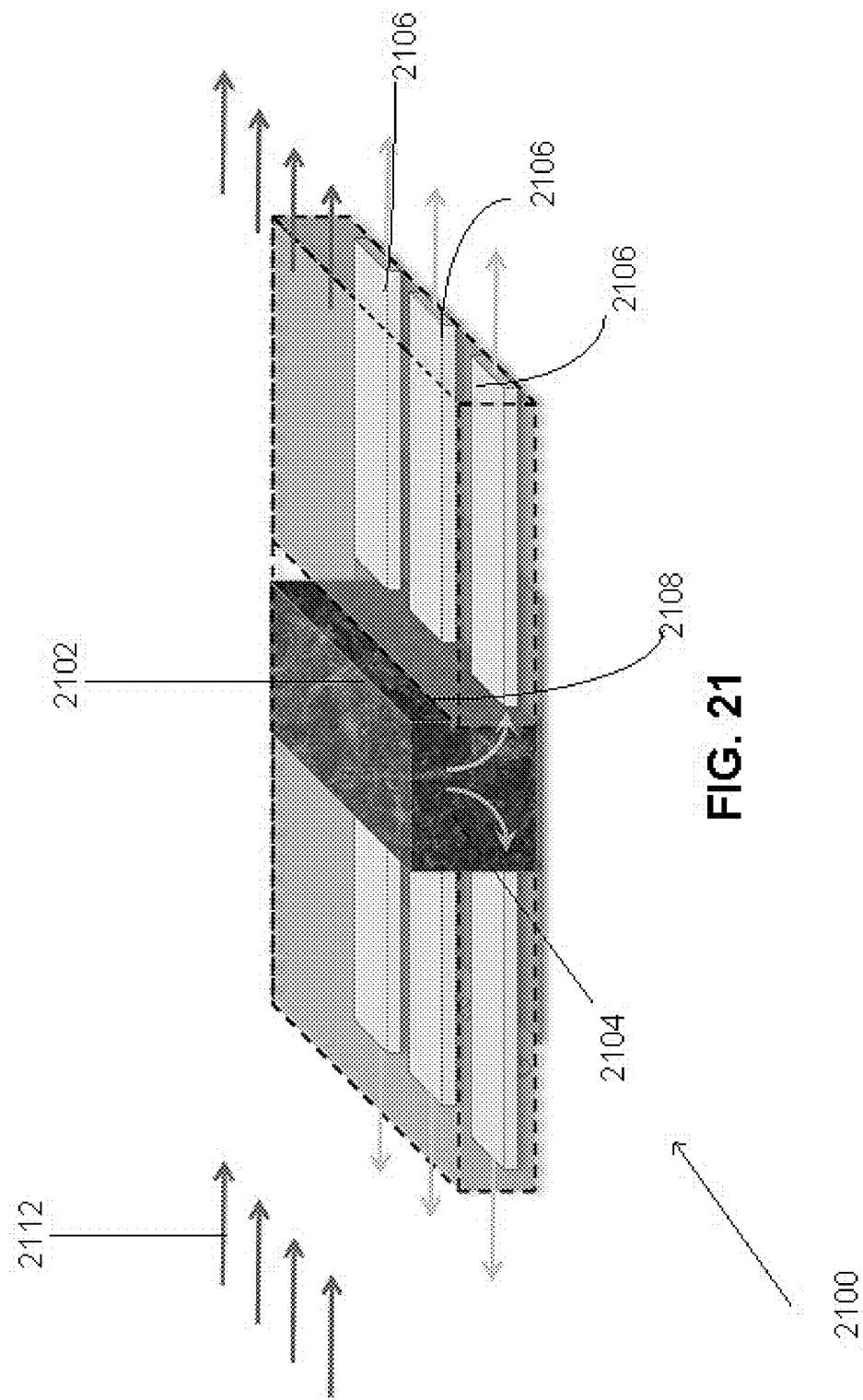
FIG. 21 is a schematic exploded perspective view of an embodiment of the device wherein the enhanced surface area electrode material is positioned to extend above the top surface of the side channel opening and into the flow path of the fluid passing through the device.

Various different embodiments of a flow-through cell device are illustrated in FIGS. 19-21. Flow-through cell devices 1900, 2000, and 2100 typically comprise electrodes (not illustrated), at least one side channel (e.g., 1902, 2002, and 2102) comprising the enhanced surface area electrode material (e.g., 1904, 2004, and 2104), and multiple outlets (e.g., 1906, 2006, and 2106) through which contaminants are removed. As illustrated in FIGS. 19-21, the enhanced surface area electrode material 1904, 2004, and 2104, which in these embodiments comprises nanosprings covered with graphene, may be positioned differently in various embodiments. For example, FIG. 19 illustrates an embodiment wherein the enhanced surface area electrode material 1904 is positioned within the side channel walls 1908, which define the side channel 1902. The enhanced surface area electrode material 1904 is substantially flush with a top surface 1910 of lamina 1912.

In other embodiments, enhanced surface area electrode material may be positioned substantially below the walls defining the side channels, such as with device 2000 illustrated in FIG. 20. The enhanced surface area electrode material 2004 is positioned below the top surface 2010 of lamina 2012.

Another alternative embodiment is device 2100 illustrated in FIG. 21. Device 2100 is designed to have enhanced surface area electrode material 2104 positioned so that it extends above the side channel walls 2108 defining the side channel 2110 and thereby providing extensions that are within the main flow path 2112.

In particular disclosed embodiments, the device has micro-scale dimensions, which facilitates rapid removal of contaminants during the discharge cycle. By using microscale-based technology, the disclosed device can be designed to incorporate minimal diffusion lengths and thereby facilitate lower transport time, higher rates of ionic species transfer, and efficient removal of ions from contaminated fluids during periods of applied electrical potential. Thus, the entire purification process including flow separation in several stages, can take place within channels having dimensions as disclosed herein. In some embodiments, each channel may be less than about 10 mm long.

As all embodiments disclosed herein are membrane-less, they are not as difficult to maintain and/or clean as devices known in the art. In particular disclosed embodiments, the device may be constructed to comprise parallel substrates comprising the features disclosed herein. In some embodiments, increased throughput of fluid carrying ionic species can be achieved through parallel operation of microscale-based features (e.g., channels, pathways, and/or beds of electrically conductive material) during operation. In particular disclosed embodiments, numerous (e.g., hundreds, thousands, or millions) channels may be located on a single lamina and each lamina may be stacked and bonded into larger units.

Certain embodiments may also be designed for large scale purification by increasing the number of device cells. For example, a large-capacity device could be made by "numbering up" banks of individual device units or by "scaling up" the basic device, although "numbering up" is a currently preferred approach. "Numbering up" may be facilitated by using a micro-lamination technique. In particular disclosed embodiments, the micro-lamination technique concerns patterning microscale features, such as microposts, fluid flow barriers, flow guides, and channels on thin sheets of lamina material, such as by using chemical etching techniques or three-dimensional printers. In some embodiments, microscale-based structures can be patterned via a number of fabrication techniques including ablation and embossing to form a number of patterned features including pillars, channels, recesses, and additional manifestations. In some embodiments, pillar structures can be formed to provide a recessed volume of the electrode lamina prior to growing extensions and/or coating such extensions with an electrically conductive material. Extensions grown uniformly within the recessed volume can create a well-defined porous bed to capture ions from the liquid flowing uniformly through the device due to the defined pillar features. To uniformly distribute fluid through the beds and/or engineered microporous structures of enhanced surface area electrode material, fluid flow paths may be fabricated and assembled as separate pieces or included in the electrode lamina to create a single piece. In some embodiments, the microscale-based structures can be used with parallel aligned electrodes (for example, aligned parallel to one another with one on top and one on bottom) with passing between. Fluid distribution also can be controlled by using a separate lamina placed in contact with an electrode lamina or by incorporating a fluid distribution path into the electrode substrate prior to growth and/or coating of extensions disclosed herein.

The thin sheets are then stacked and bonded into larger units with a large number of parallel microscale features. Due to the low operating temperature of the system, thin (e.g., having thicknesses ranging from about 100 µm to about 500 µm) inexpensive laminae materials can be used. The laminae are first embossed to produce the required pathway flow features. Sections of each lamina surface are then enhanced with the high surface electrode layer, and stacks of laminae are then bonded together using either adhesives or a compression seal. In large-volume production, roll-embossing, automated stacking, and bonding can be used for low-cost fabrication.

Figure 22:
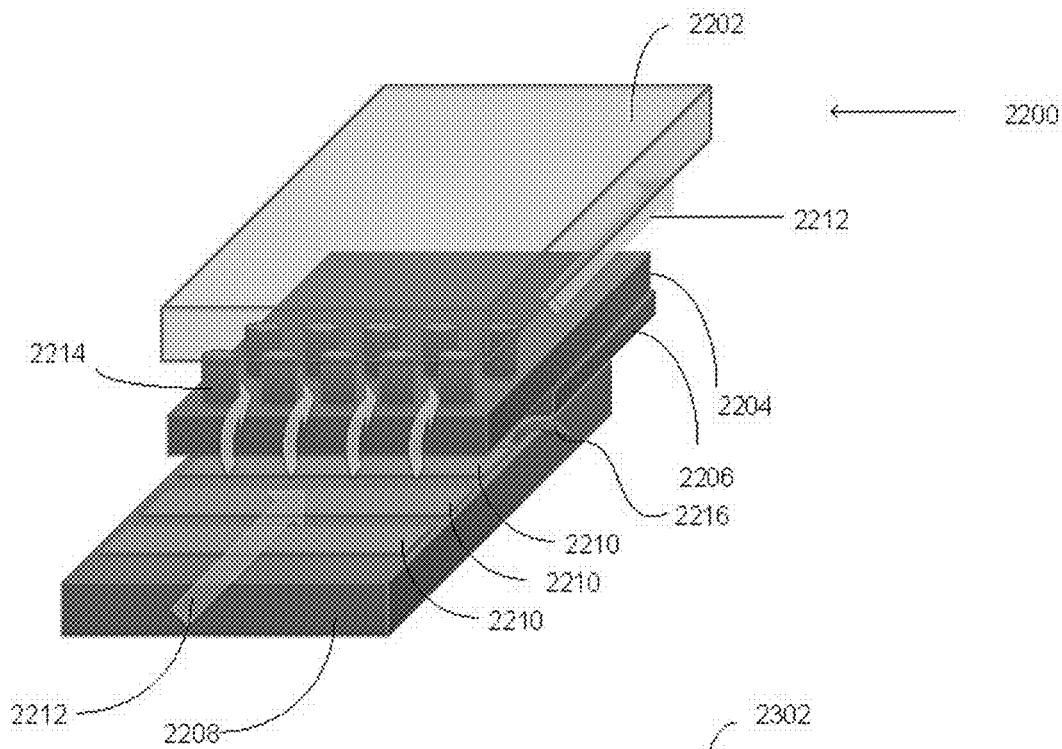
FIG. 22 is a schematic exploded perspective view of another embodiment of the device.
Figure 23:
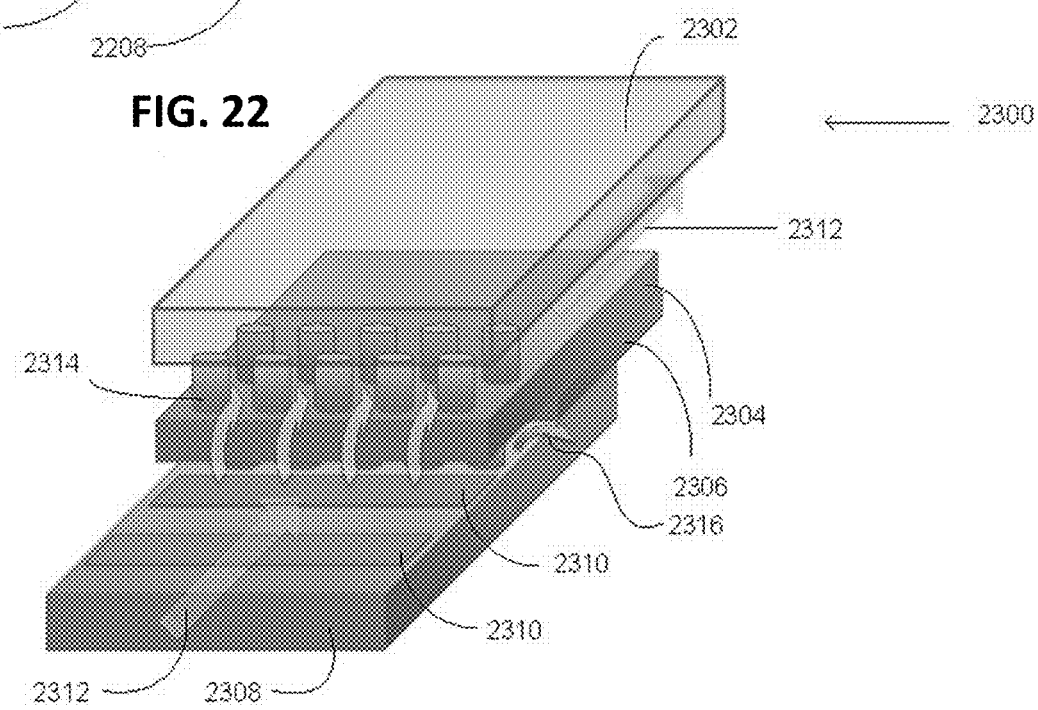
FIG. 23 is a schematic exploded perspective view of another embodiment of the device similar to that illustrated in FIG. 22, but with fewer electrode layers.

Other embodiments of the device are described in FIGS. 22 and 23 and FIGS. 24-28A/28B. FIGS. 22 and 23 illustrate two embodiments of the disclosed device. Devices 2200 and 2300 comprise a top lamina (2202 and 2302, respectively), a second lamina layer (2204 and 2304, respectively), a third lamina layer (2206 and 2306, respectively) and an electrode lamina (2208 and 2308, respectively). The electrode lamina (2208 and 2308, respectively) comprises at least one electrode (2210 and 2310, respectively). As illustrated in FIG. 22, device 2200 comprises three electrodes 2210, or, as illustrated in FIG. 23, device 2300 comprises two electrodes 2310. Fluid enters device 2200 and device 2300 via flow paths (2212 and 2312, respectively), and is directed between top lamina (2202 and 2302, respectively) and second lamina (2204 and 2304, respectively) and flows between pillars (2214 and 2314, respectively). Contaminants in the fluid, which are separated by electrodes (2210 and 2310, respectively), are expelled from device 2200 and device 2300 via flow paths 2216 and 2316 (respectively).

Figure 24:
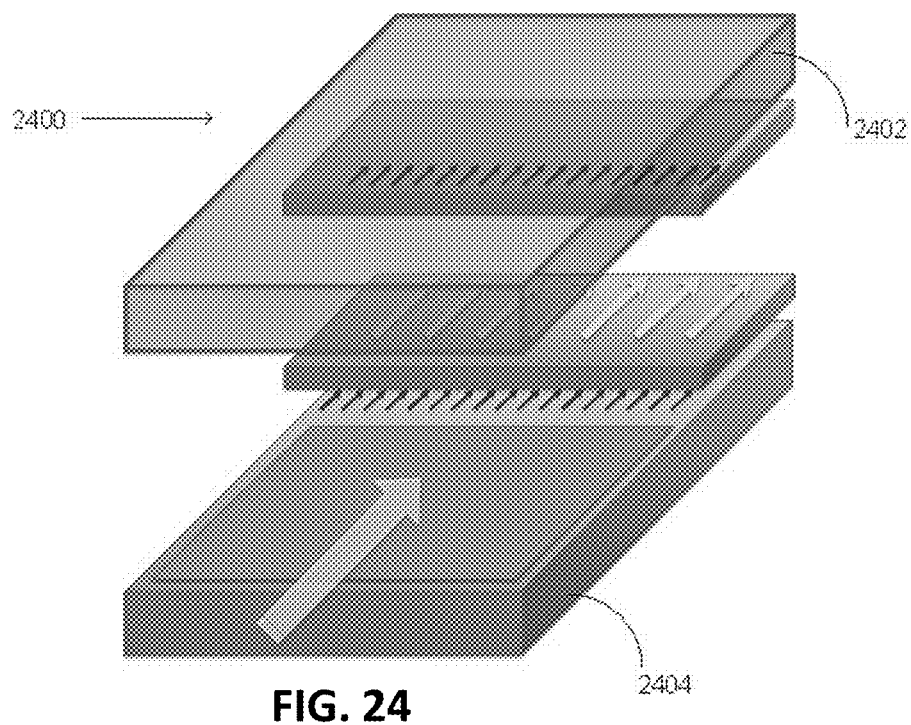
FIG. 24 is a schematic exploded perspective view of yet another embodiment of the device.
Figure 25:
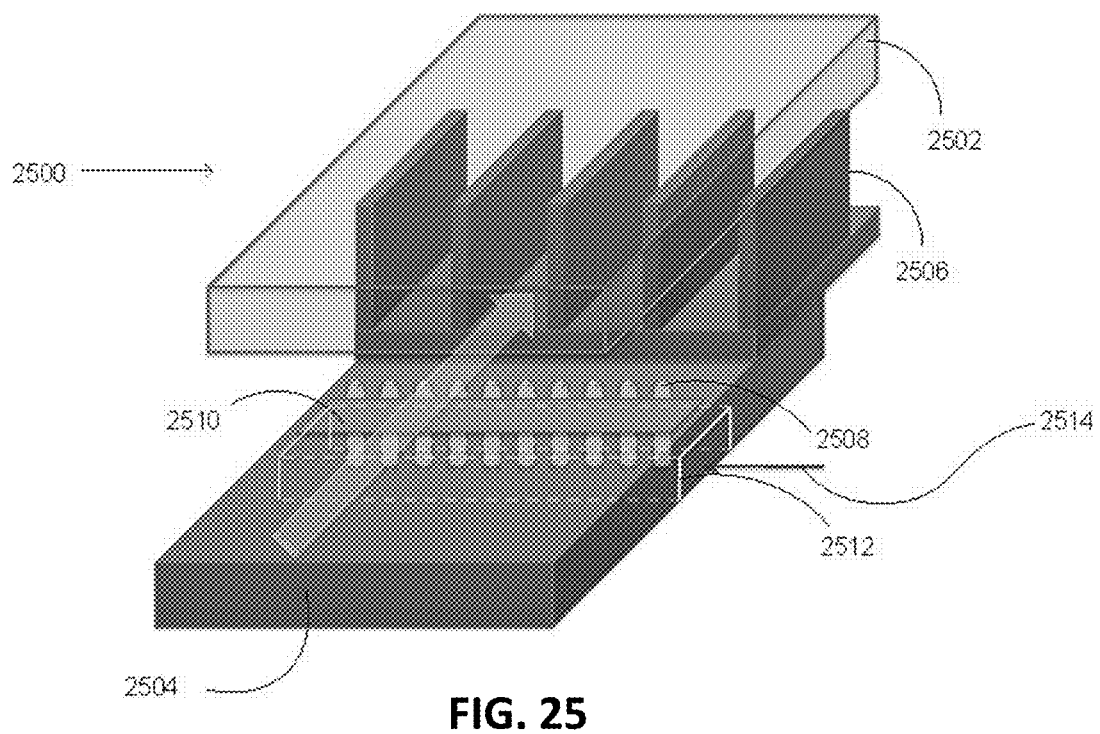
FIG. 25 is a schematic exploded perspective view of an embodiment of the device comprising pillars having a rectangular shape.

Other embodiments of the disclosed device are illustrated in FIGS. 24 and 25. Each device (2400 and 2500) comprises a top lamina (2402 and 2502) and an electrode-containing lamina (2404 and 2504). Device 2500 comprises pillars 2506, which support the top lamina 2502, and also comprises side channels 2508 through which contaminants isolated by electrode 2510 may be directed to separation zone 2512 and expelled via flow path 2514.

Figure 26:
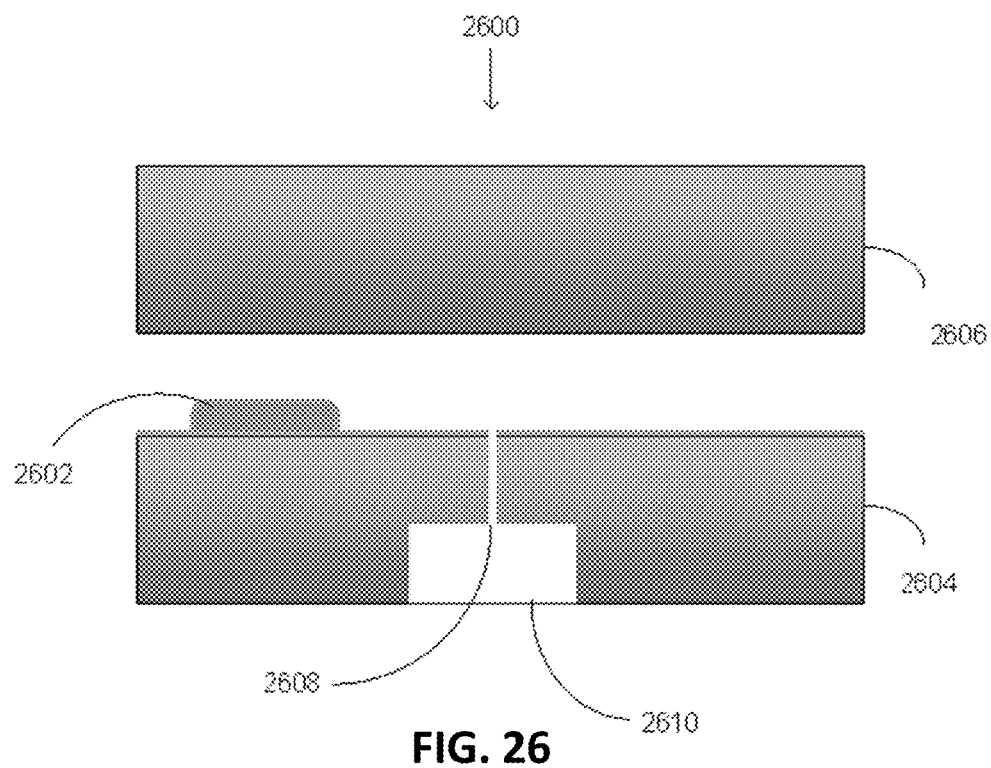
FIG. 26 is a cross-sectional view of a portion of a device wherein the electrode layer is positioned within a main flow pathway.
Figure 27:
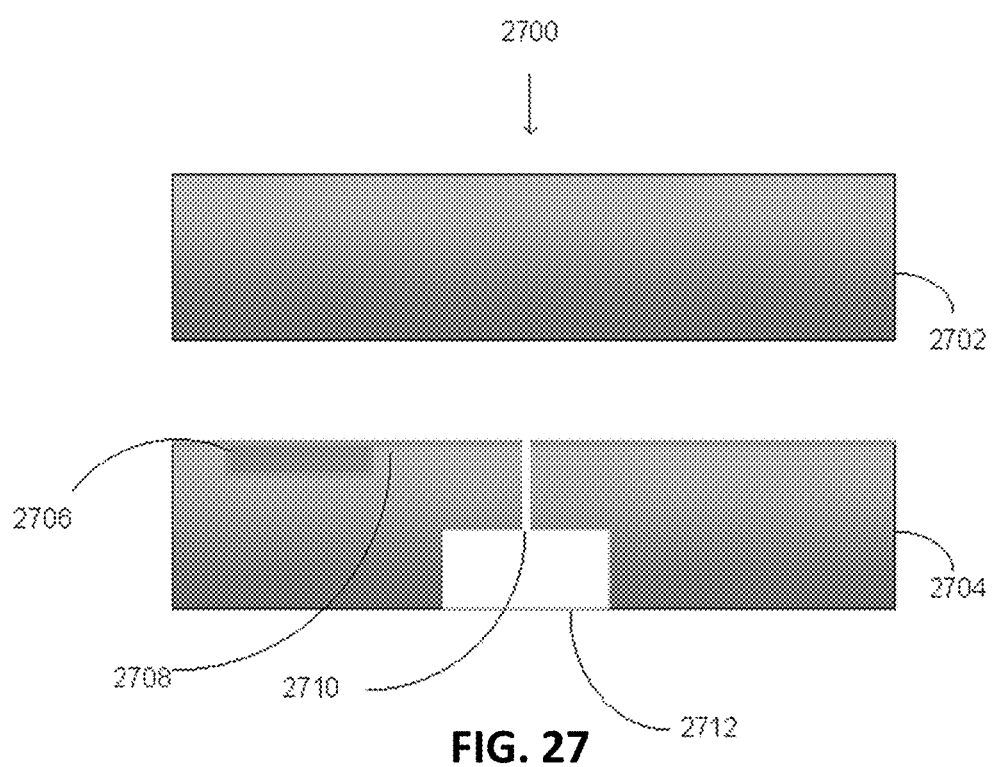
FIG. 27 is a cross-sectional view of a portion of a device wherein the electrode layer is positioned below the top surface of a main flow pathway.

As indicated herein, the electrode and/or enhanced surface area electrode material may be placed in a variety of positions within the device. Two exemplary embodiments are illustrated in FIGS. 26 and 27. As illustrated in FIG. 26, device 2600 comprises electrode layer 2602, which is positioned on lamina 2604 and extends into the main flow pathway defined between lamina 2606 and lamina 2604. Lamina 2604 is further designed to comprise a side channel 2608 and separation zone 2610. A different orientation of the electrode layer is illustrated in FIG. 27. According to FIG. 27, device 2700 comprises lamina 2702 and lamina 2704. Electrode layer 2706 is positioned on lamina 2704 and is positioned below the top surface 2708 of lamina 2704. Like device 2600, the lamina 2604 of device 2700 is further designed to comprise a side channel 2710 and separation zone 2712.

Figure 28A:
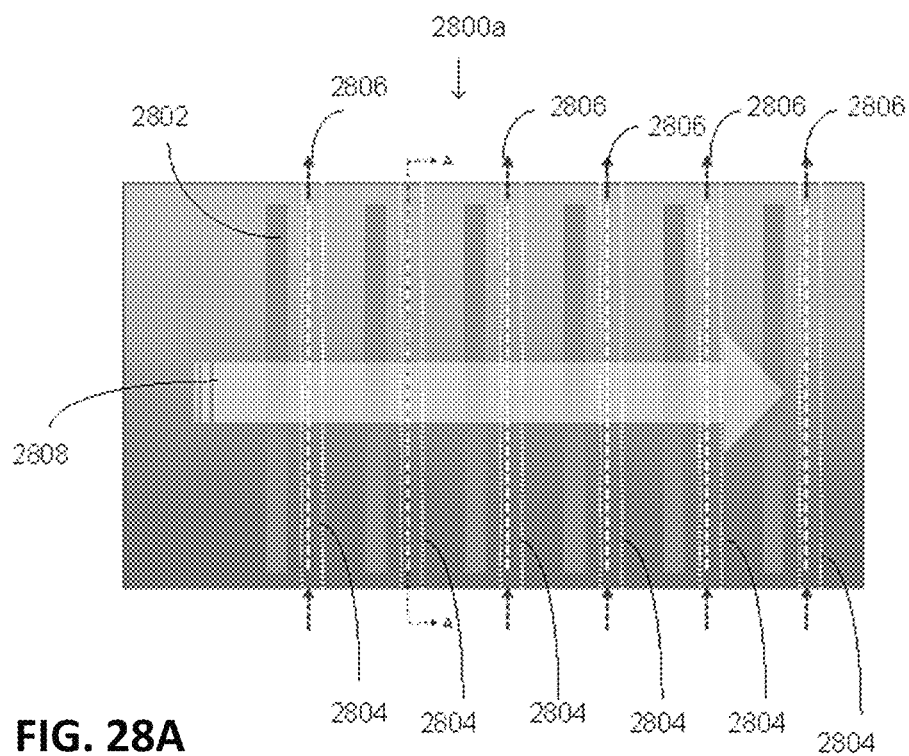
FIGS. 28A-28C are schematic drawings of embodiments of the disclosed device.
Figure 28B:
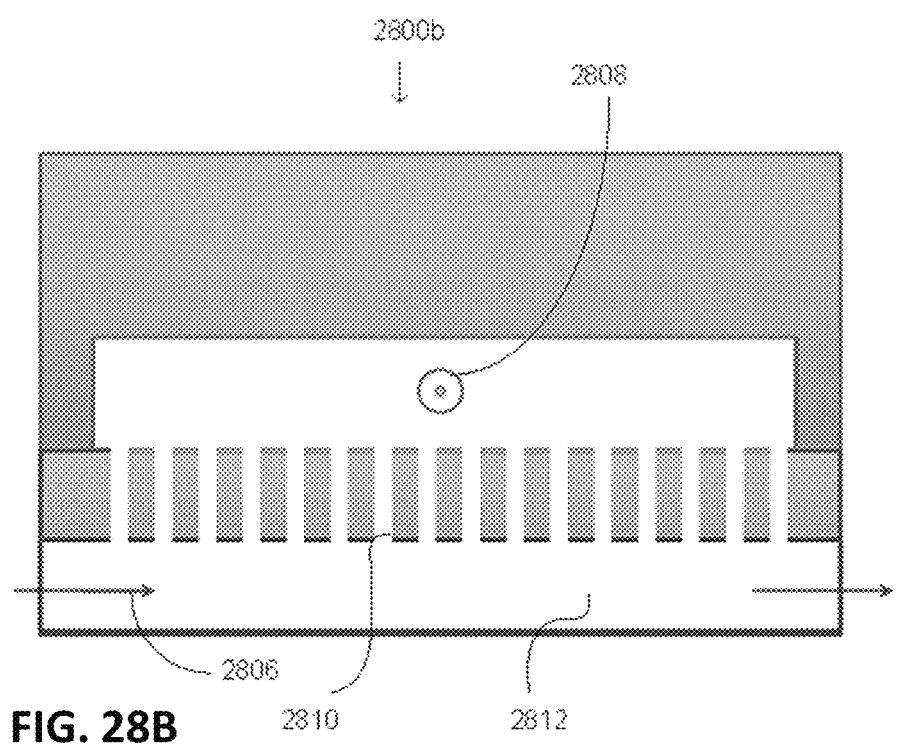
Figure 28C:
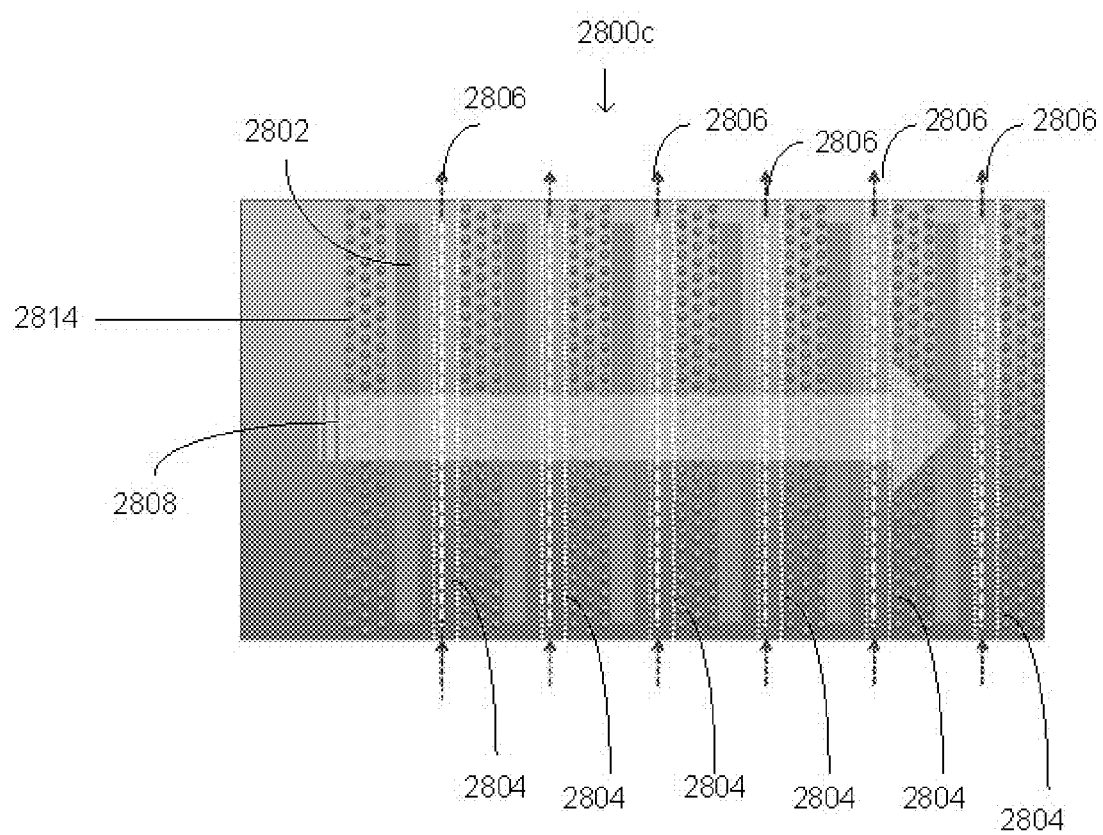

FIG. 28A provides an illustration of another embodiment of the device suitable for application in a parallel and serial orientation of device cells 2800a. Device cell 2800a comprises multiple electrode layers 2802 comprising nanosprings (not illustrated), which are positioned away from crosscurrent channels 2804. The distance at which the electrode layer 2802 are placed from the crosscurrent channels 2804 can be modified and typically is chosen to provide a sufficient distance in which the ionic contaminant cloud can travel from the electrode layer 2802 to the crosscurrent channels 2804. Side channel flow path 2806 sweeps the ions from the device cell 2800a and sequentially purified fluid flows through the main flow path 2808. FIG. 28B is a cross-sectional view (2800b) taken along cross-section A of FIG. 28A. FIG. 28B illustrates the side channels 2810 that deliver contaminants to separation zone 2812, through which exit flow path 2806 flows. As illustrated in FIG. 28B, main flow path 2808 flows in a direction that is perpendicular to the exit flow path 2814. FIG. 28C illustrates a similar device 2800c that has been modified with multiple pillars 2814, but still comprises the same components illustrated in FIGS. 28A and 28B (i.e., electrodes 2802, exit flow paths 2806, and crosscurrent channels 2804).

Figure 29:
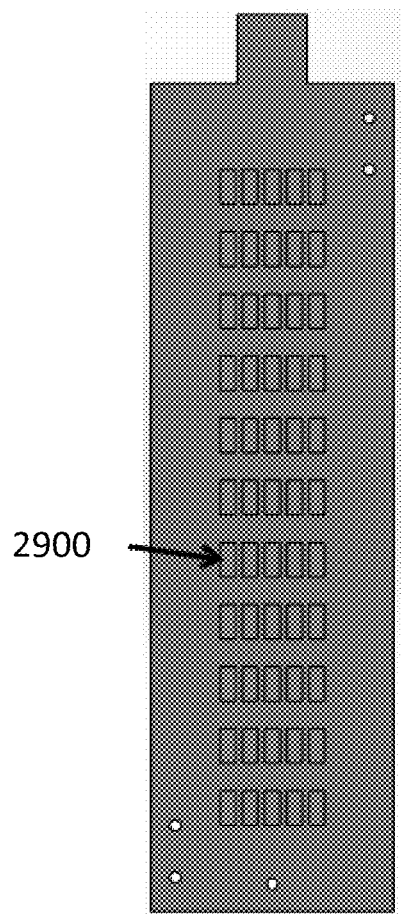
FIG. 29 is a top plan view of a parallel operating electrode comprising individual, parallel oriented beds.
Figure 30:
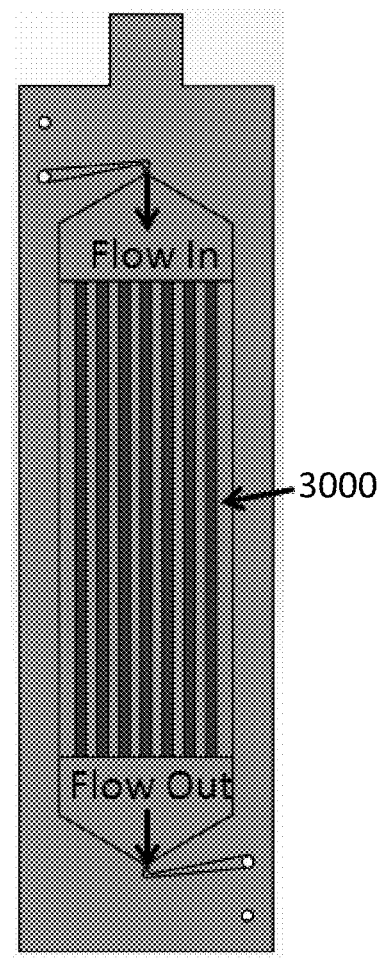
FIG. 30 is a top plan view of a parallel operating electrode comprising an alternative arrangement of parallel individual beds.
Figure 31:
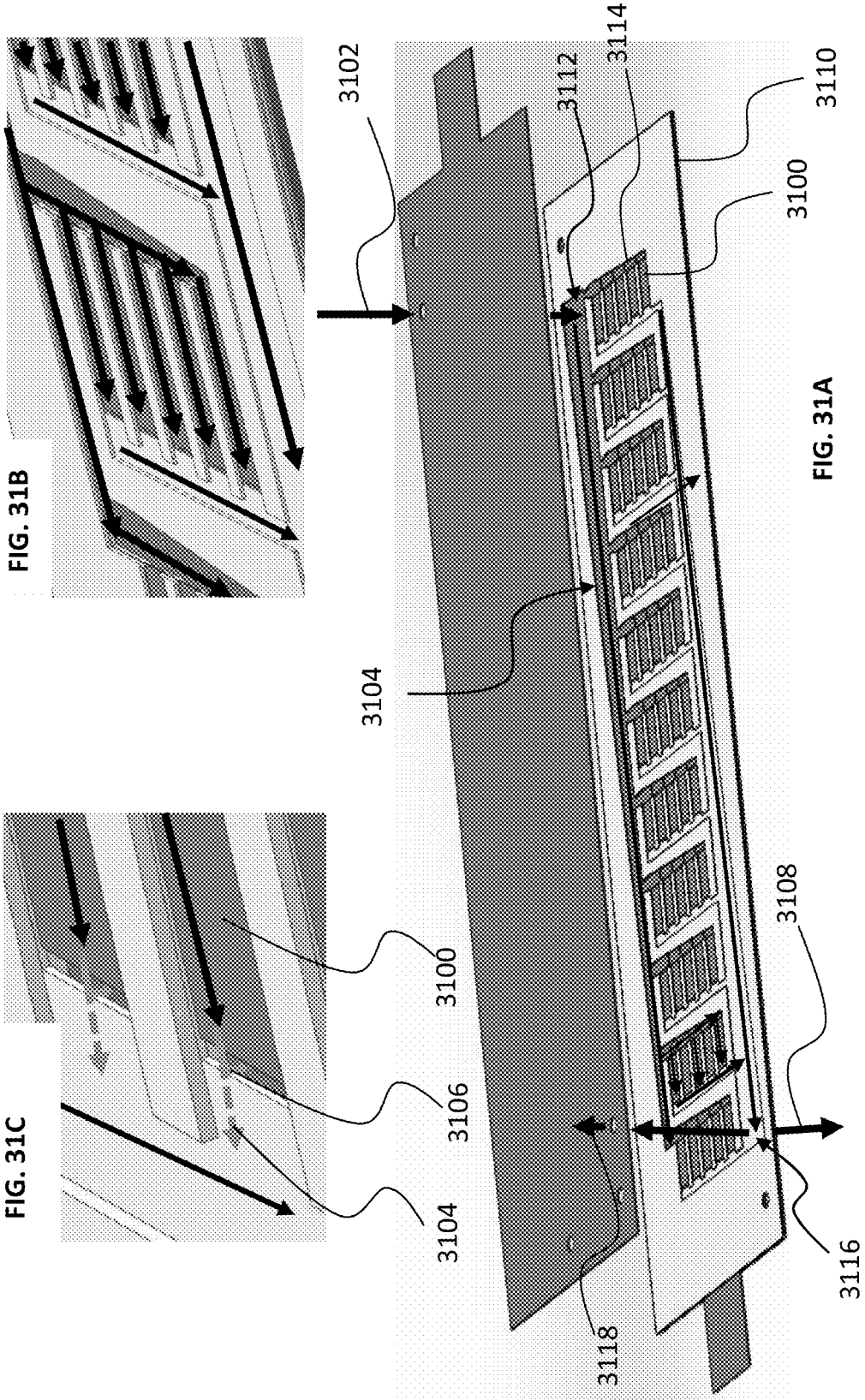
FIGS. 31A-31C are schematic drawings of an embodiment of a device for segregated flow through parallel operating electrodes.
Figure 32:
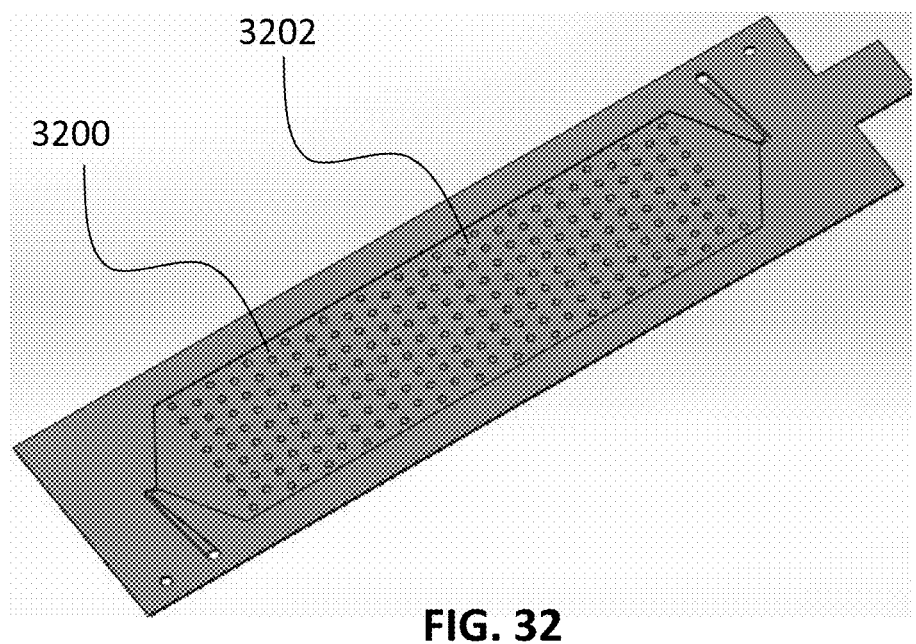
FIG. 32 is a perspective view of an electrode lamina comprising a plurality of pillar structures providing a recessed volume suitable for receiving or growing an electrode layer.
Figure 33:
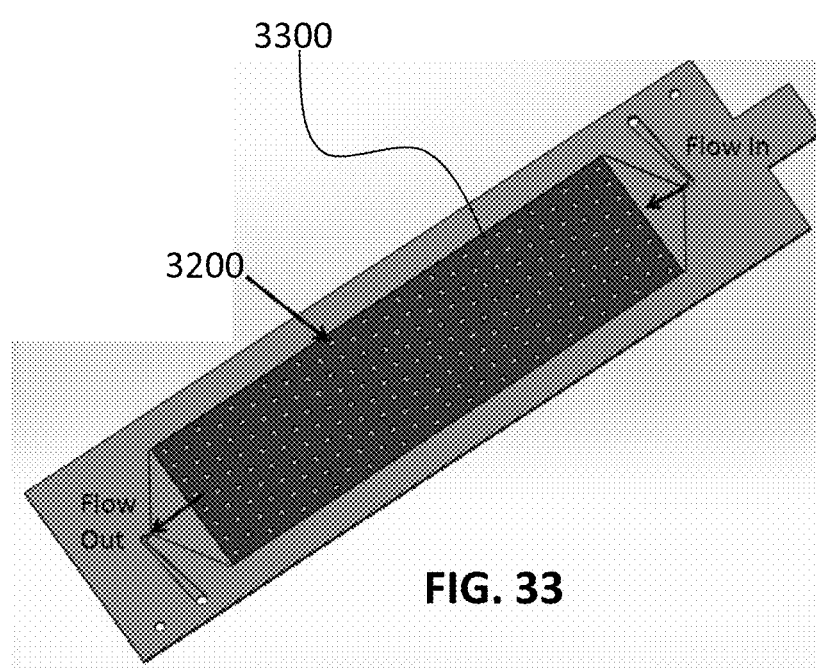
FIG. 33 is a perspective view of the electrode lamina of FIG. 32 further comprising an electrode layer of extensions coated with an electrically conductive material.

An example of an electrode layer comprising 55 individual, parallel operating nanospring beds is illustrated in FIG. 29. The embodiment illustrated in FIG. 29 includes nanospring beds 2900. In some embodiments, the nanospring bed can have the following dimensions: 2 mm to 3 mm wide, such as 2.2 mm wide; 4 mm to 6 mm long, such as 5 mm wide, and 80 µm to 120 µm tall, such as 100 Beds 2900 illustrated in FIG. 29 can be altered to any dimension disclosed herein and scaled with an increased footprint of the CDT electrode. An alternative example of a parallel channel electrode is illustrated in FIG. 30. The embodiment illustrated in FIG. 30 includes seven individual beds 3000 having dimensions of 1.5 millimeters wide, 66 millimeters long and 100 micrometers tall. FIGS. 31A-31C provide schematic illustrations of a layout of a device that can be used with a segregated flow scheme of an electrode layer comprising parallel operating nanospring beds. With reference to the embodiment illustrated in FIGS. 31A-31C, the segregated enhanced surface area electrode layers, such as enhanced surface area beds 3100 (see FIG. 31C) comprising an enhanced surface area electrode material having multiple extensions that extend from the electrode beds, such as nanograss in heights up to 500 micrometers tall, are placed in parallel to one another on electrode layer-modified lamina 3110 with a minimal separation distance as low as 15 micrometers. Contaminated fluid (represented by arrow 3102) is introduced in inlet 3112 and is fed to the individual beds 3100 using side channels 3114, which are fluidly coupled to a non-conductive main flow path 3104 (FIG. 31A) defined by the electrode layer-modified lamina 3110. The uniformly distributed fluid passes through the individual beds continuously during charging and discharging of the system. During the application of electrical potential the lower concentrated fluids passes on the upper portion of the exiting flow separation unit (dashed line 3104 in FIG. 31 C) where it is recollected from the individual beds and exits the system via outlet 3116 (substantially purified fluid flow is represented by arrow 3118). During the discharging cycle, higher concentrated ionic fluid follows the lower fluid separation path (curved arrow 3106 in FIG. 31C) where the brine solution (represented by arrow 3108) recollects from the individual bed outlets and exits the microfluidic structure. The segregated parallel flow channels pathways minimize mixing of diluted and concentrated flows exited the electrode beds to maximize single stage efficiency in the same footprint. FIG. 32 provides an exemplary illustration of an electrode lamina comprising pillar structures 3200 thereby providing a recessed volume 3202 for receiving or growing extensions comprising or modified to comprise an electrically conductive material, such as the nanograss 3300 illustrated in FIG. 33.

IV. Method of Use

Also disclosed herein is a method of using disclosed device embodiments for purifying fluids. In particular disclosed embodiments, the method concerns using electric fields to collect ions on two opposing electrode layers. For example, in particular disclosed embodiments, the device may undergo a charge phase during which an electric field is applied and ionic species are attracted to the opposing electrodes, with the number of accumulated ionic species being increased by using the high surface area electrode portion of the device (e.g., the extensions disclosed herein). During a charge phase, the device gathers sufficient ions to function as a charged capacitor that stores the applied energy. The disclosed device's ability to store this energy also provides the ability to then recover this energy in a later discharge phase.

The discharge phase, or cycle, involves turning off the electric field, at which point (e.g., substantially instantaneously) the ions leave the electrode surface to form an ion cloud within voids of the enhanced surface area electrode material (e.g., within the pores of the extensions disclosed herein). After the discharge cycle, applied fluid shunt flow sweeps the high concentration of ions in the ion cloud out of the cell, leaving purified fluid having a reduced concentration of contaminants.

In particular disclosed embodiments, the disclosed device is used in a method for purifying water, particularly water comprising ionic contaminants. Particular contaminants include, but are not limited to, $Ca^{2+}$, $Na^+$, $Mg^{2+}$, $CN^-$, $NO_3^-$, $F^-$, $Cl^-$, $Fe^{3+}$, $Cu^{2+}$, $Pb^{2+}$, $SO_4^{2-}$, $K^+$, $HCO_3^-$, $Br^-$, $BO_3^{3-}$, $SiO_3^{2-}$, $I^-$, and combinations thereof. The fast, efficient, and segregated removal of retained ionic species is important for facilitating high recovery production of purified water. This goal is achieved using the disclosed method, as it provides convective removal of ionic species via a segregated flow path during a period of no applied electrical potential. In particular embodiments of the disclosed method, the discharge stage's feedstock flows through the enhanced porous electrode layer into shunt streams (defined by the disclosed side channels) designed to remove the highly concentrated ions from the electrode surface and flush these ions out of the device.

In one embodiment of the disclosed method, a pulsed flow method is used to operate the disclosed device. In these embodiments, pulsed flow operation refers to an adjusted preferential flow ratio (e.g., the flow rate through main flow pathway in relation to the flow rate through the side flow channels) during the charging and discharging cycles described herein. Pulsed flow may be generated by alternatively increasing or decreasing resistance to flow through the main flow pathway versus the flow through the side channels. Valves may be used to either substantially completely or at least partially restrict flow through each of the main flow pathway and/or side channels. The frequencies of the pressure oscillations in the side channel or the main flow pathway are related to operating parameters of the device. For instance, the capacity of the high surface area electrode material to accumulate ionic species, the volumetric flow rate of fluid in the main flow pathway and the side channels, as well as the compliance of the microscale-based structure are all parameters that can be manipulated to control the range of pressure oscillation frequencies. In some embodiments, the pressure oscillation frequency can range from greater than zero Hz to about 15 Hz, such as about 0.05 Hz to about 10 Hz. The pressure operating cycle can include using a longer or shorter time period during high-pressure resistance in either flow pathway (e.g., main flow pathway or side channels) than is applied in the other flow pathway (e.g., side channels or main flow pathway). The oscillating pressure cycle can be synchronized with the charging and discharging cycles, as is described below.

Pulsed flow operation allows the device to operate with minimal ion recapture. In some embodiments, increasing fluid flow through the side channels during a discharge phase/cycle allows fast and efficient removal of contaminants. Pulsed operation decreases the discharging time necessary to flush captured ions from the system, while decreasing ion recapture by the enhanced electrode layer and decreasing ion flow through the main pathway. In particular embodiments, higher flow rates through the main pathway during the charging process increase the amount of desalinated water produced in each stage by minimizing flow through the side channels. Pulsed flow operation also allows for individual optimization of the charging and discharging cycles of each particular stage (or microscale-based cell) used in embodiments of the device having multiple stages (or microscale-based cells). In particular disclosed embodiments, pulsed flow operation provides discharging efficiencies of about 95%, which increase the performance and efficiency of the device by operating at low recapture rates and increasing the number of ions isolated during each charging cycle.

In particular disclosed embodiments, such as those embodiments wherein the device comprises multiple device cells arranged in parallel, the frequency of operation is selected based on several factors, including diffusion rates of ionic species, fluid convection, the electrode layer's capacity for salt capture, and geometric characteristics of the device.

In particular disclosed embodiments, a device may be made up of a plurality of single device cells that are arranged in series. For example, a device that comprises a plurality of individual device cells may comprise from about 2 to about 16 device cells that are arranged in series to provide the desired purified fluid. In certain embodiments, 1 to about 14 device cells (such as 8 to 14 device cells) are arranged in series to obtain fluid that has a desired purity level. The device also may comprise multiple device cells that are arranged both in parallel and in series. This disclosed parallel/sequential arrangement of individual device cells has unique characteristics because the disclosed device cells separate contaminants from the main fluid stream, rather than clean fluid from the main impure fluid stream. The quantity of contaminants separated in a single stage is subject to independent variables; thus, if the device is operated in a manner that increases the number of contaminants that are isolated and removed from the fluid, a corresponding increase in the amount of fluid that is withdrawn with these contaminants is not necessary. The amount of fluid that is withdrawn with the contaminants for each stage of operation should be between about 1% and about 50% of the incoming main stream of fluid arriving at each stage.

The enhanced surface area electrode material may have a variable position with respect to the main flow pathway and the side channels. In particular disclosed embodiments, the enhanced surface area electrode material may be positioned close to the inlet as well as within the walls defining the side channels. In certain embodiments, the fluid, and any contaminants in the fluid, can be transported to each portion of the enhanced surface area electrode material that is provided within the device by powering and de-powering electrodes in a wave-like fashion. In additional disclosed embodiments, the enhanced surface area electrode material may be positioned substantially away from the entry port of the fluid, and at any point substantially downstream from the entry port.

In particular disclosed embodiments, the disclosed device uses minimal diffusion lengths for the ionic species to be transported from the bulk fluid to the electrode surface, thereby lowering the characteristic times of transport phenomena. This design results in higher rates of ionic species transfer and the efficient removal of ions from highly impure water sources during periods of applied electrical potential.

In other disclosed embodiments, the device can be used in combination with a droplet injection scheme to alleviate back-diffusion and onward-diffusion, which is a challenge often not resolved by conventional devices. Back-diffusion (and onward-diffusion) of concentrated ions (e.g., sodium chloride) into an already clean segment of the flow stream is difficult to control in devices comprising microscale-based structures. The diffusion process can be extremely fast (e.g., 10-1000 ms) over small distances (e.g., 1-100 µm), thus creating conditions for fast back-mixing of already separated ions into an already clean water flow segment. An interface region between concentrated and decontaminated water flow segments can be present in embodiments of a CDT device during cyclic operation. Clean and concentrated fluid streams can mix (e.g., by back-mixing or onward-mixing) at this interface region, which can reduce the efficiency of a CDT device, particularly devices having a cell length of 1-5 mm.

In some embodiments, back-diffusion and onward diffusion can be prevented by implementing a droplet injection method with device embodiments disclosed herein. The device embodiments disclosed herein can be modified to comprise a pair of conductivity micro-sensors within the boundaries of a main flow pathway. One of the conductivity micro-sensors can be positioned proximal to an electrode comprising an enhanced surface area electrode material and the other conductivity micro-sensor can be placed downstream of the first conductivity micro-sensor. In some embodiments, the conductivity micro-sensor located downstream of the first conductivity micro-sensor can be positioned proximal to one or more side channels/flow pathways through which purified fluids or contaminants are fed. The conductivity micro-sensors can provide a signal to initiate injection of one or more small droplets into a main flow pathway of the device through a droplet side channel (or pathway) located proximal to the electrode. The conductivity micro-sensors can detect changes in ion concentration in the fluid flowing through the main flow pathway. The conductivity micro-sensor positioned proximal to the electrode can detect an increase or a decrease in ion concentration as a concentrated contaminant segment is released from the electrode into the main flow pathway. Once a change in ion concentration is detected the sensor sends a signal to an electronic circuit electrically coupled to one or both of the conductivity micro-sensors, which then initiates action of a solenoid valve. The solenoid valve is fluidly coupled to the main flow pathway through a side channel and is capable of producing one or more droplets that can enter into the main flow pathway. In particular disclosed embodiments, one or more air droplets can be injected individually (or simultaneously) into the droplet side channel or side pathway. The other micro-conductivity sensor, which is positioned downstream of the first conductivity micro-sensor can also detect an increase or decrease in ion concentration near an outlet of the device and send a signal to an electronic circuit coupled to the micro-conductivity sensor, which can be the same or different as the electronic circuit that initiates the solenoid valve. The electronic circuit can then send the signal to an appropriate valve that is used to control flow through the main flow pathway thereby changing the back pressure in one or more side channels through which purified fluid is expelled. The same valve and pressure change technology can be used to redirect flow through a separate side channel as the concentrated contaminant segment flows through the main flow pathway and is detected by the second conductivity micro-sensor.

The droplets used in the droplet injection method can be formed from any medium capable of providing separation between fluid flow segments. In some embodiments, the droplets can be in the form of a fluid, such as a gas or liquid, with particular embodiments using air bubbles. The droplets can provide separation between fluid flow segments passing through a main flow pathway by preventing the concentrated contaminant segments from mixing with and/or diffusing into purified fluid segments passing through the main flow pathway. In particular disclosed embodiments, a concentrated contaminant segment can be isolated from a purified fluid segment by using a main flow pathway that is formed from or is coated with a hydrophobic material. In some embodiments, a small contact angle (e.g., less than about 70°) can be achieved at the contact line between the fluid flow segment, the pathway surface, and the droplet thereby drying the flow pathway surface and eliminate or substantially reduce back-diffusion of concentrated ions.

FIGS. 34A-34I are schematic diagrams of theoretical flow through a device embodiment where no back-diffusion and/or onward-diffusion occurs during multiple phases of operation. Each of FIGS. 34A-34I is accompanied by a graph of ion concentration as a function of time, which illustrates the ion concentration of each contaminant segment as it accumulates and is released. The concentrated contaminant segment in each graph tracks contaminant segment 3406 as it passes through the main flow pathway. FIG. 34A illustrates a main flow pathway 3400 of a device embodiment comprising an electrode 3402 coated with an enhanced surface area electrode material. As illustrated in FIG. 34B, contaminated fluid 3404 that passes through the main flow pathway 3400 comes into contact with the electrode 3402 whereby ions are collected on the electrode, producing a concentrated contaminant segment 3406. Purified fluid 3408 can thereby be separated from the concentrated contaminant segment 3406, which remains on the electrode 3402. The purified fluid segment 3408 can be expelled from the device through a side channel 3410, which remains open, whereas another side channel 3412 capable of expelling contaminant ions is closed. FIG. 34C illustrates the end of one phase of operation wherein the electrode 3402 is substantially covered with ion contaminants. FIG. 34D illustrates flow through the main flow pathway 3400 as electrode 3402 is switched off and the concentrated contaminant segment 3406 is released from the electrode and additional contaminated fluid 3404 is introduced. As illustrated further in FIGS. 34E and 34F, flow continues through the main flow pathway 3400 so that the concentrated contaminant segment 3406 progresses through the main flow pathway and additional ions are again accumulated on the electrode 3402. FIG. 34G illustrates removal of the concentrated contaminant segment 3406 from the device through side channel 3412 as side channel 3410 is closed. FIG. 35H illustrates flow as side channel 3412 is closed and another purified fluid segment 3408 is redirected through side channel 3410 and expelled from the device. FIG. 34I illustrates another phase whereby the electrode 3402 is switched off and another concentrated contaminant segment 3406 is released from the electrode. As illustrated in FIGS. 34A-34I, no back-diffusion or onward-diffusion occurs, thereby resulting in a fully efficient device.

In contrast to the ideal flow scheme illustrated in FIGS. 34A-34I, FIGS. 35A-35C illustrate how back-diffusion and onward diffusion causes mixing between concentrated contaminated segment 3500 and purified fluid segment 3502. Each of FIGS. 35A-35CI is accompanied by a graph of ion concentration as a function of time, which illustrates the ion concentration of each contaminant segment as it accumulates and is released. The concentrated contaminant segment in each graph tracks contaminant segment 3500 as it passes through the main flow pathway. As illustrated in FIGS. 35A and 35B, back-diffusion (illustrated as box 3504) and onward-diffusion (illustrated as box 3506) can occur when the electrode 3508 is switched off and the concentrated contaminant segment 3500 is released from the electrode, with contaminated fluid 3510 entering the device. FIG. 35C illustrates accumulation of a subsequent concentrated contaminant segment 3500 as the electrode 3508 is switched back on. This back-diffusion and onward-diffusion can decrease the efficiency and performance of the device.

The droplet injection method described above can be used to minimize or prevent back-diffusion and onward-diffusion. An exemplary embodiment of a droplet injection method is illustrated in FIGS. 36A-36C. Each of FIGS. 36A-36C is accompanied by a graph of ion concentration as a function of time, which illustrates the ion concentration of each contaminant segment as it accumulates and is released. The concentrated contaminant segment in each graph tracks contaminant segment 3600 as it passes through the main flow pathway. FIG. 36A illustrates an accumulated concentrated contaminant segment 3600. Also illustrated in FIG. 36A is droplet 3602, which is introduced proximal to the concentrated contaminant segment 3600 through a droplet side channel (or side pathway) 3604 so as to separate concentrated contaminant segment 3600 from purified fluid segment 3606. Droplet injection is triggered by a conductivity micro-sensor 3608 that is positioned proximal to the electrode 3602, whereas a second conductivity micro-sensor 3610 is positioned downstream of the conductivity micro-sensor 3608. As electrode 3612 is switched off and additional contaminated fluid 3614 enters the device, the concentrated contaminant segment 3600 is released from the electrode. The conductivity micro-sensor 3608 can detect changes in the concentration of the concentrated contaminant segment 3600 and thereby trigger injection of another droplet 3602 through side channel 3616. By using the two droplets 3602 located at each end of the concentrated contaminant segment 3600, back-diffusion and onward-diffusion can be prevented. FIG. 36C illustrates another operation phase as the electrode is switched back on and another concentrated contaminant segment 3600 is built up on the electrode.

In particular disclosed embodiments, the mass of ionic species captured and retained in the presence of an applied electrical potential can affect the results obtained using the disclosed device. In particular disclosed embodiments, the lower limit of the species captured is obtained by using a single exposed electrode layer. Increasing the exposed surface area of the electrode increases the number of captured ionic species.

V. Examples

Initial data/modeling: Mathematical modeling and numerical simulations were to provide basic scale factors and operating parameters of the microscale-based CDT technology. As a result, dimensions for the test article were derived and the understanding of the timescales and dynamics of ionic motion in the electric field were translated into a device design. Modeling of electric phenomena was combined with the chemical engineering modeling of ion concentrations near the electrodes. This effort led to a unique insight into technical features that improve the efficiency of the device by using enhanced electrode surface materials. As a result, an enhanced electrode can be designed. The relationship between electrode surface enhancement and CDT cell performance was established and factored into the designing the device.

Based on modeling data, a single stage desalination cell is expected to remove up to about 8% to about 15% of the contaminant content from the incoming stream. Solely by way of example, sea water contains approximately 30,000 ppm of salt which should be reduced to about 500 ppm to make it potable. This reduction is expected to require approximately 8 to 14 stages of desalination cells in series; however, with increased electrode surface area, the disclosed device can be used to significantly reduce the number of stages needed to produce desalinated sea water from about 2 to 4.

Figure 37:
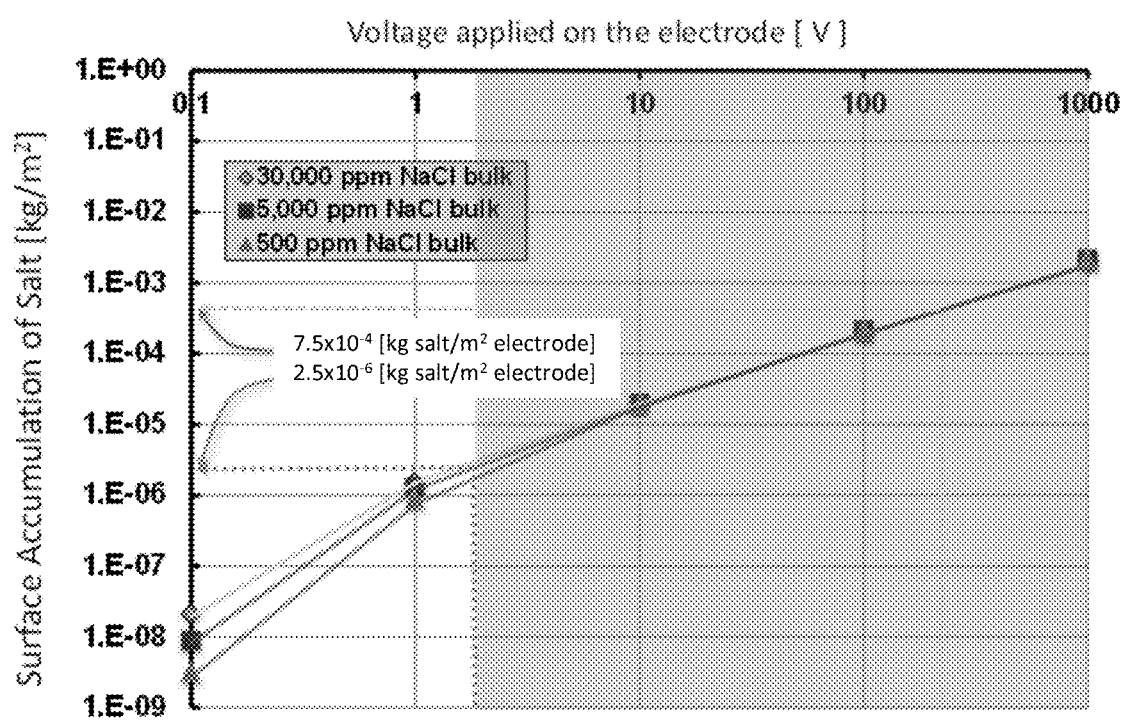
FIG. 37 is a graph of surface accumulation of salt as a function of voltage (volts) applied to an electrode.
Figure 38:
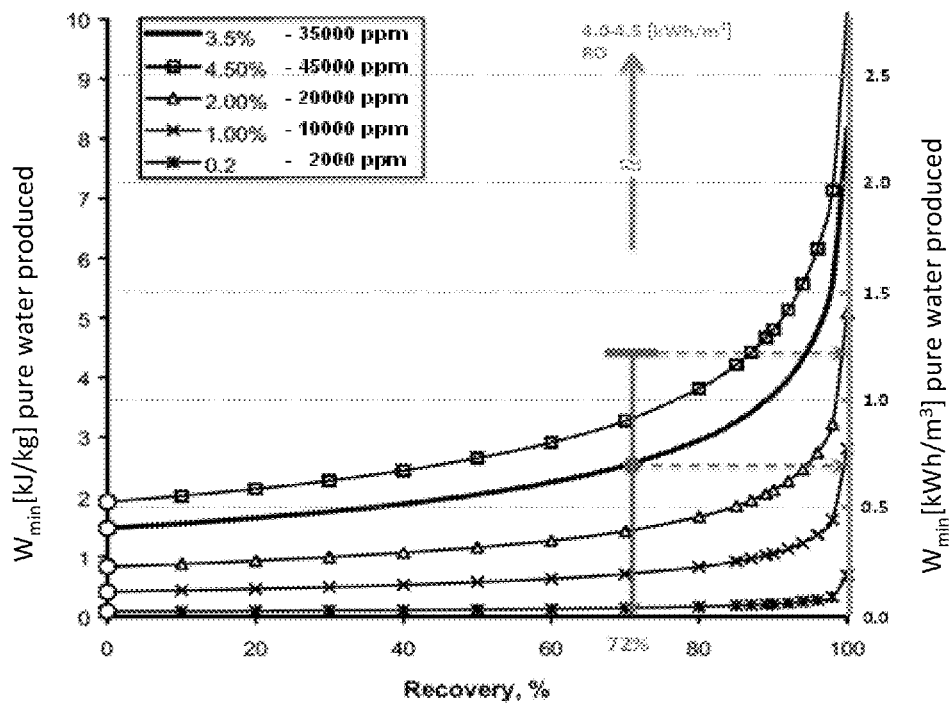
FIG. 38 is a graph of $W_{min}$[kJ/kg] pure water produced ($W_{min}$[kWh/m$^3$] pure water produced) as a function of recovery.
Figure 39:
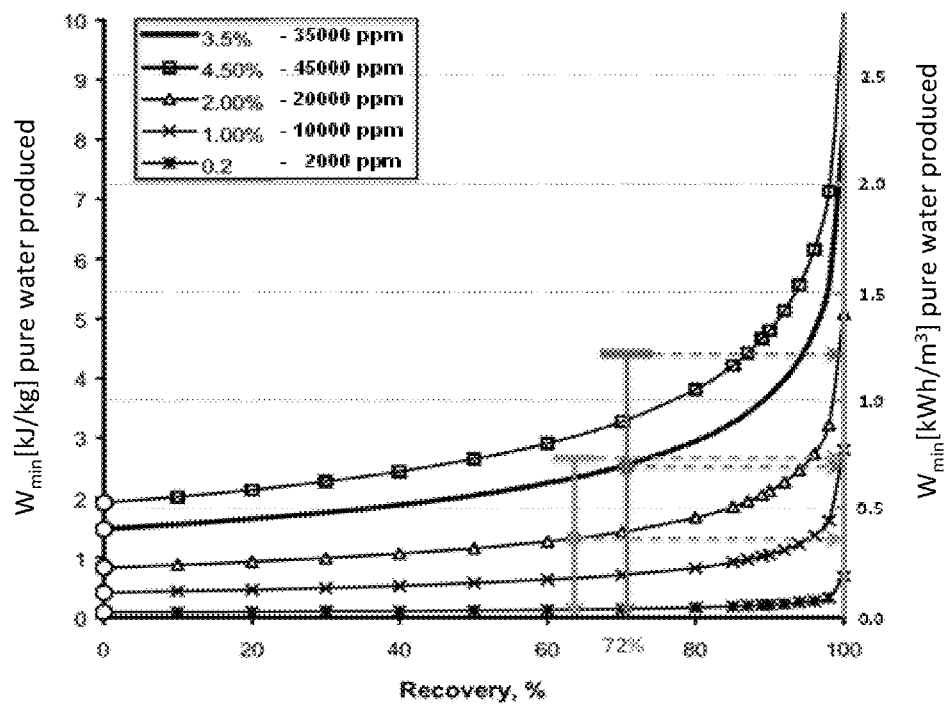
FIG. 39 is a graph of $W_{min}$[kJ/kg] pure water produced ($W_{min}$[kWh/m$^3$] pure water produced) as a function of recovery.

Exemplary system modeling data is provided in FIGS. 37, 38, and 39.

Example 1

This example describes a desalination test article comprising an arrangement of channels and electrically conductive materials functioning as capacitors. The channel dimensions of this particular embodiment are between 50 μm and 200 μm high and between 200 μm and 1 cm wide.

Applying an electric field to the electrically conductive layer enriched the porous part of the flow-system with salt. Separating this fraction from the total flow and exiting it through a side channel reduced salt concentration in the clean water outlet compared to the salt water inlet. The fraction of clean outgoing water obtained can vary between about 50% and about 97% of the incoming flow volume.

Example 2

This example concerns preliminary studies that were conducted in order to evaluate performance of one embodiment of a disclosed device and method. As disclosed herein, the number of operational stages required for producing purified fluid, such as desalinated water from high salinity water sources, is directly impacted by the total enhanced surface area of the channel electrodes utilized in the device. In this example, three system performance studies were performed with COMSOL Multiphysics 4.2a to investigate the required process stages necessary to produce water having less than 500 ppm salt from an original 35,000 ppm salt source with three surface enhanced electrodes: 707 cm$^2$ total surface area per 1 cm$^2$ nominal footprint; 1414 cm$^2$ total surface area per 1 cm$^2$ nominal footprint; and 2828 cm$^2$ total surface area per 1 cm$^2$ nominal footprint.

System geometry, flow conditions, and initial salt water concentration remained constant for each surface enhancement studied. As the surface enhancement increased, the total salt captured by the electrode during periods of applied electrical potential increased linearly, resulting in a higher removal of salt ions from the water stream with each charging process. Through this analysis, clean drinking water (e.g., <500 ppm salt concentration), was attainable in eight stages with a surface enhancement of 707 cm$^2$ total surface area per 1 cm$^2$ nominal footprint. Doubling the total enhanced surface area to 1414 cm$^2$ total surface area per 1 cm$^2$ nominal footprint reduced the required number of operational stages from eight stages to five stages. A further reduction to two stages is achieved with a surface enhancement of 2828 cm$^2$ total surface area per 1 cm$^2$ nominal footprint.

| Stage | ppm start | ppm end | % change | H[μm] |
|---|---|---|---|---|
| 1 | 30,000 | 26,250 | 12.50 | 200 |
| 2 | 26,250 | 22,500 | 14.29 | 200 |
| 3 | 22,500 | 18,750 | 16.67 | 200 |
| 4 | 18,750 | 15,000 | 20.00 | 200 |
| 5 | 15,000 | 11,250 | 25.00 | 200 |
| 6 | 11,250 | 7,500 | 33.33 | 200 |
| 7 | 7,500 | 3,750 | 50.00 | 200 |
| 8 | 3,750 | 0 | 100.00 | 200 |

The reduced number of necessary operational stages with increased surface enhancement disclosed in this particular example illustrates the potential for continuous performance and system improvements as new high surface area electrodes are developed and fabricated. An additional impact of reducing the required operational stages with increasing surface enhancement is the reduction in energy recovery steps required in the production of desalinated water, thus increasing the energy efficiency of the system.

Example 3

In this example, improved capture and elution of ions for the purpose of water desalination by capacitive deionization technology was demonstrated using an embodiment of the disclosed micro-scale based reactors comprising silicon dioxide nanograss coated with pyrolyzed graphitic material to create a conductive, high-surface area electrode matrix capable of ion sequestration under an applied voltage. The microchannel(s) used in this example was 5 cm long, 0.5 cm wide and 250 micrometers tall. Salt water was sent into the system at flow rates of 0.05, 0.1, 0.2, and 0.4 mL per minute. The salt concentration in the liquid stream was determined using a flow through an Upchurch Conductivity electrode manufactured by Microelectrodes, Inc. positioned on the exit line of the laboratory prototype system.

Deionized water was flowed through the system to remove any contamination present within the system for a period of 10 minutes at 0.1 mL/min. The salt solution was fed into the microchannel reactor for a period of 10 minutes at a designated flow rate. An applied potential of 2.0 V DC, a square signal generated and controlled by LabView, was applied to the CDT electrodes, creating a region of highly concentrated ionic layers at the surface of the electrode and reducing the concentration of the bulk fluid passing through. The applied voltage was maintained on the electrodes until the exiting concentration was similar and consistent to the original feed. The applied voltage was then removed, allowing the captured ions to disperse from the electrode surface and into the bulk fluid, increasing the concentration of the discharge fluid leaving the microchannel. The exiting concentration was recorded until a constant and consistent reading, similar to the feed concentration, was again observed.

TABLE 1

| Trial | Flow Rate [mL/min] | Nominal Residence Time [seconds] | Single or Double Growth | Feed Concentration [ppm] | Maximum Discharge Concentration [ppm] |
|---|---|---|---|---|---|
| 1 | 0.10 | 37.5 | Single | 13,283 | 18,520 |
| 2 | 0.10 | 37.5 | Single | 14,077 | 19,274 |
| 3 | 0.05 | 75.0 | Double | 13,600 | 18,000 |
| 4 | 0.05 | 75.0 | Double | 12,747 | 17,500 |
| 5 | 0.10 | 37.5 | Double | 12,291 | 19,800 |
| 6 | 0.20 | 18.8 | Double | 13,739 | 20,100 |
| 7 | 0.20 | 18.8 | Double | 13,601 | 19,890 |
| 8 | 0.20 | 18.8 | Double | 14,037 | 20,460 |
| 9 | 0.40 | 9.4 | Double | 14,017 | 24,230 |

This process was followed and repeated for electrodes coated with a single layer of graphite coated nanograss and two layers of graphite coated nanograss for the conditions listed in the Table 1, above.

As seen in Table 1, the second coating of conductive nanograss can improve the desalination ability of the system itself. At a flow rate of 0.1 mL/min, the double-coated electrodes removed approximately an additional 900 ppm of salt (on average measured at the peak exit concentration) compared to the single coated layer. At lower flow rates, (0.05 mL/min for example), the double-coated system showed smaller peak exit concentration than at higher flow rates (0.40 mL/min) This is somewhat counterintuitive, but may result from conditions related to back-diffusion of salt that has just been discharged from the electrode. Diffusion is one of the strongest transport mechanisms in small distances characteristic for microscale-based devices. Thus, when accumulated salt is released from the electrode it quickly diffuses into regions of low concentration irrespective of the direction of fluid flow. At lower flow rates the mean resident time of fluid in microchannel is longer, thus allowing longer time for salt to diffuse in all directions towards regions of lower concentration.

Figure 40:
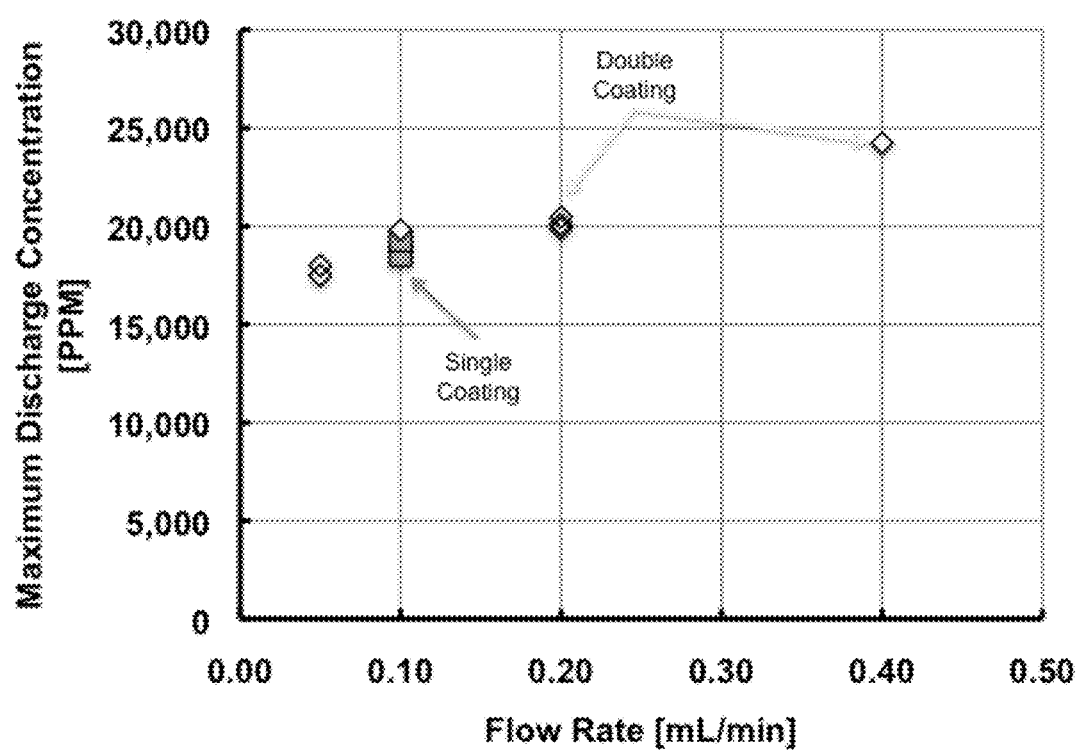
FIG. 40 is a graph of maximum discharge concentration (ppm) as a function of flow rate (mL/min) showing the differences in maximum discharge concentration between embodiments of a device comprising a single coating of conductive nanomaterial and a double coating of conductive nanomaterial.

The direct relationship between fluid flow rate and salt removal can be seen in FIG. 40 for the double-coated electrode. Repeatability in salt removal under similar operating conditions was established as seen in trials 1 & 2, and 6 through 8 of Table 1.

Figure 41A:
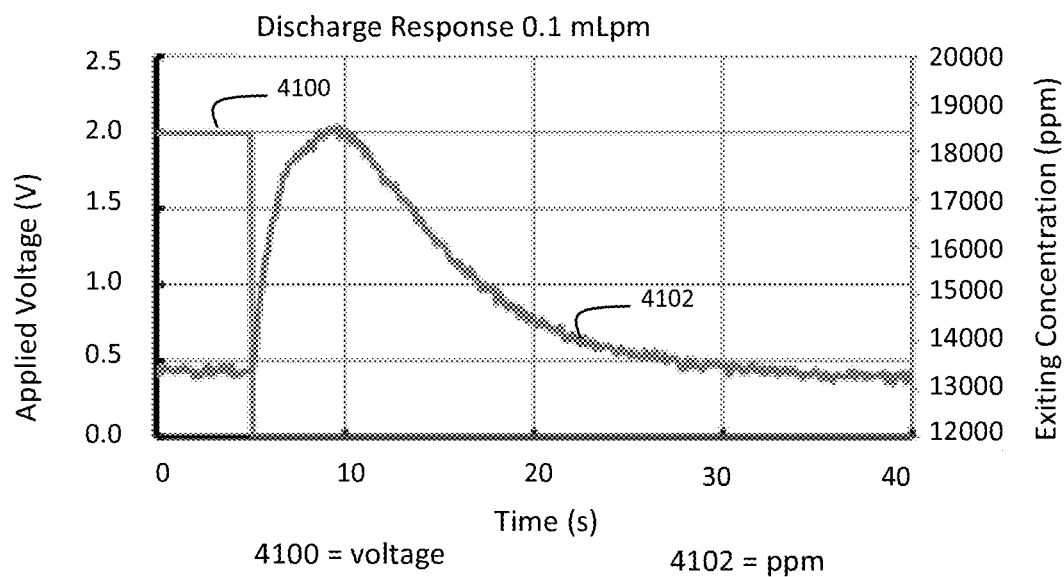
FIGS. 41A and 41B are graphs of applied voltage (V) and exiting concentration (ppm) as a function of time (seconds) illustrating results obtained from embodiments of devices described herein with different discharge responses (0.1 mLpm, FIG. 41A; and 0.2 mLpm, FIG. 41B).
Figure 41B:
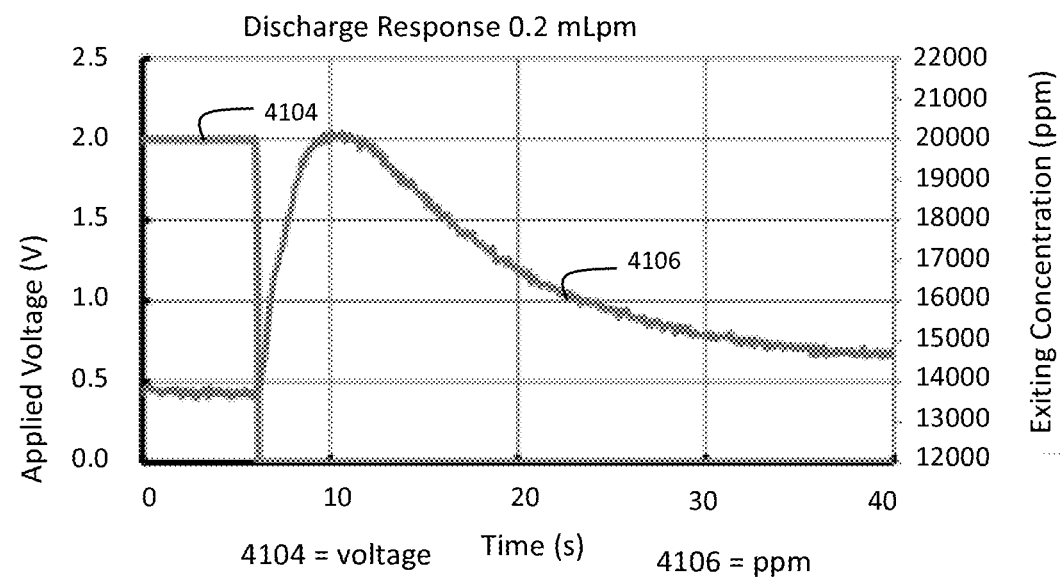

A sample response of the discharging system can be seen in FIGS. 41A and 41B (where the lines labeled 4100 and 4104 represent voltage and the lines labeled 4102 and 4106 represent concentration in parts per million). During the experimental investigation, a square signal was used to apply the DC voltage necessary to sequester the ions at the surface of the enhanced area electrode bed. The square wave was utilized for simplicity at this stage of the development; however, a triangular ramp could be used to improve the effectiveness of the system to load ions near the surface of the electrode. The triangular ramp will allow a more orderly arrangement of ions at the surface that will increase their density in subsequent layers, resulting in an increase in captured ions and a larger drop in single stage effectiveness. In this example, the double-coated electrodes improve the removal of salt as compared to the electrodes used with only a single nanograss coating.

In view of the many possible embodiments to which the principles of the present disclosure may be applied, it should be recognized that the illustrated embodiments are only preferred examples of the disclosure and should not be taken as limiting its scope. Rather, the scope is defined by the following claims. We therefore claim as our invention all that comes within the scope and spirit of these claims.

We claim:

1. A device for use in purifying contaminated fluid to provide substantially purified fluid, comprising:
   a substrate in which at least one main flow pathway is defined and wherein a portion of the substrate is connected to an electrode layer comprising an enhanced surface area electrode material having multiple extensions comprising nanostructures coated with one or more layers of an electrically conductive material, wherein the multiple extensions extend from the electrode layer;
   an inlet through which the contaminated fluid enters the device;
   an outlet through which the substantially purified fluid obtained from the contaminated fluid exits the device; and
   at least one side channel fluidly coupled to the main flow pathway through which contaminants from the contaminated fluid are expelled.

2. The device of claim 1 wherein the device is a microfluidic device.

3. The device of claim 1, wherein the substrate is made from a material selected from a polymeric material comprising polycarbonate, polyethylene terephthalate (PET), polyether imide (PEI), poly(methyl methacrylate) (PMMA), poly(tetrafluoroethylene) (PTFE), hexafluoropropylene, vinylidene fluoride, perfluoromethylvinylether, or a copolymer thereof, glass, carbon-based material, or combinations thereof.

4. The device of claim 1, wherein the device further comprises a cover lamina that is stacked above the substrate and that is formed from a polymeric material, glass, a carbon-based material, or combinations thereof.

5. The device of claim 1, wherein the substrate has a thickness ranging from about 20 µm to about 550 µm.

6. The device of claim 1, wherein the main flow pathway has a height ranging from about 40 µm to 250 µm and a width ranging from about 150 µm to about 100 cm.

7. The device of claim 1, wherein the electrically conductive material is graphene.

8. The device of claim 1, wherein the device comprises a plurality of electrode layers that are connected to the substrate and are segregated from one another and arranged in a parallel orientation with the main flow pathway, which is positioned to provide fluid flow to a plurality of side channels that are capable of feeding fluid over the plurality of electrode layers.

9. The device of claim 1 wherein the at least one side channel is positioned to provide a side flow that is perpendicular to main flow through the main flow pathway.

10. The device of claim 1, wherein the nanostructures are nanowires having a diameter of about 30 nm to about 200 nm and a height of about 1 pm to about 100 pm and comprising silica.

11. The device of claim 10, wherein the nanowires are coiled and have a diameter of about 200 nm and a height of about 1 μm to about 100 μm.

12. A device, comprising:
   an substrate configured to define at least one main flow pathway through which contaminated fluid flows and wherein a portion of the substrate is connected to an electrode layer comprising an enhanced surface area electrode material having nanowires that extend from the electrode layer, wherein the nanowires have a diameter of about 30 nm to about 200 nm and a height of about 1 μm to about 100 μm and comprise silica;
   a region defined in the substrate where the contaminated fluid enters the device;
   a region defined in the substrate where substantially purified fluid obtained from the contaminated fluid exits the device; and
   at least one side channel fluidly coupled to the main flow pathway through which contaminants are expelled.

13. A method for purifying fluid to provide substantially purified fluid, comprising:
   introducing a stream of impure fluid comprising one or more contaminants into a device including,
      an substrate in which at least one main flow pathway through which fluid flows is defined and wherein a portion of the substrate is connected to an electrode layer comprising an enhanced surface area electrode material having multiple extensions comprising nanostructures coated with one or more layers of an electrically conductive material, wherein the multiple extensions extend from the electrode layer;
      an inlet through which the stream of impure fluid enters the device;
      an outlet through which the substantially purified fluid obtained from the contaminated fluid exits the device; and
      at least one side channel fluidly coupled to the main flow pathway through which the one or more contaminants are expelled upon release from the electrode layer; and
   collecting the substantially purified fluid from the device.

14. The method of claim 13, wherein the fluid is selected from a polar fluid, a non-polar fluid, a biological fluid, or a combination thereof; and the contaminants are selected from inorganic salts; inorganic ions; metals, metal alloys, or ions thereof; or any combinations thereof.

15. The method of claim 13, further comprising applying an electric field to the device.

16. The method of claim 13, wherein the method is performed continuously or batch-wise.

17. The method of claim 13, wherein the method further comprises introducing a first droplet and a second droplet into the main flow pathway through a droplet side channel positioned proximal to the enhanced surface area electrode, wherein the first droplet is introduced prior to the release of the one or more contaminants from the electrode layer and the second droplet is introduced into the device after the release of the one or more contaminants from the electrode layer so as to prevent back-diffusion and/or onward-diffusion between the one or more contaminants and the substantially purified fluid.

18. The method of claim 13, wherein the device further comprises one or more valves for controlling flow of the substantially purified fluid and the contaminants and the method further comprises opening and closing the one or more valves to facilitate flow of the substantially purified fluid or the contaminants from the main flow pathway to one or more side channels.

* * * * *